United States Patent
Tzinis et al.

(10) Patent No.: US 12,217,768 B2
(45) Date of Patent: Feb. 4, 2025

(54) AUDIO-VISUAL SEPARATION OF ON-SCREEN SOUNDS BASED ON MACHINE LEARNING MODELS

(71) Applicant: Google LLC, Mountain View, CA (US)

(72) Inventors: Efthymios Tzinis, Urbana, IL (US); Scott Wisdom, Boston, MA (US); Aren Jansen, Mountain View, CA (US); John R. Hershey, Winchester, MA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/226,545

(22) Filed: Jul. 26, 2023

(65) Prior Publication Data

US 2023/0386502 A1 Nov. 30, 2023

Related U.S. Application Data

(63) Continuation of application No. 17/214,186, filed on Mar. 26, 2021, now Pat. No. 11,756,570.

(51) Int. Cl.
*G10L 25/57* (2013.01)
*G06F 18/214* (2023.01)
(Continued)

(52) U.S. Cl.
CPC .......... *G10L 25/57* (2013.01); *G06F 18/214* (2023.01); *G06N 3/088* (2013.01); *G06V 20/40* (2022.01); *G10L 25/30* (2013.01)

(58) Field of Classification Search
CPC ......... G10L 25/57; G10L 25/30; G06V 20/40; G06F 18/214; G06N 3/088
See application file for complete search history.

(56) References Cited

U.S. PATENT DOCUMENTS 11,456,004 B2 * 9/2022 Younessian ......... G10L 21/0364
11,475,908 B2 * 10/2022 Wichern ............... G10L 21/028
(Continued)

FOREIGN PATENT DOCUMENTS

CN 112992172 A * 6/2021 ........... G06N 3/0454

OTHER PUBLICATIONS

Ariel Ephrat, Inbar Mosseri, Oran Lang, Tali Dekel, Kevin Wilson, Avinatan Hassidim, William T. Freeman, and Michael Rubinstein. "Looking to listen at the cocktail party: a speaker-independent audio-visual model for speech separation." ACMTransactions on Graphics (TOG) 2018, pp. 1-11, vol. 37, No. 4.
(Continued)

*Primary Examiner* — Olisa Anwah
(74) *Attorney, Agent, or Firm* — McDonnell Boehnen Hulbert & Berghoff LLP

(57) ABSTRACT

Apparatus and methods related to separation of audio sources are provided. The method includes receiving an audio waveform associated with a plurality of video frames. The method includes estimating, by a neural network, one or more audio sources associated with the plurality of video frames. The method includes generating, by the neural network, one or more audio embeddings corresponding to the one or more estimated audio sources. The method includes determining, based on the audio embeddings and a video embedding, whether one or more audio sources of the one or more estimated audio sources correspond to objects in the plurality of video frames. The method includes predicting, by the neural network and based on the one or more audio embeddings and the video embedding, a version of the audio waveform comprising audio sources that correspond to objects in the plurality of video frames.

20 Claims, 8 Drawing Sheets

(51) Int. Cl.
    *G06N 3/088* (2023.01)
    *G06V 20/40* (2022.01)
    *G10L 25/30* (2013.01)

(56) References Cited

U.S. PATENT DOCUMENTS

| | | | | |
|---|---|---|---|---|
| 11,769,045 | B2* | 9/2023 | Hsu | G06N 3/048 367/118 |
| 2021/0304123 | A1* | 9/2021 | Vanapalli | G06V 10/774 |
| 2022/0130407 | A1* | 4/2022 | Xu | G10L 25/57 |
| 2022/0159278 | A1* | 5/2022 | Habibian | H04N 19/197 |

OTHER PUBLICATIONS

Iya Kavalerov, Scott Wisdom, Hakan Erdogan, Brian Patton, Kevin Wilson, Jonathan Le Roux, and John R. Hershey. "Universal Sound Separation," IEEE Workshop on Applications of Signal Processing to Audio and Acoustics (WASPAA), New Paltz, NY, USA, 2019, pp. 175-179.

Efthymios Tzinis, Scott Wisdom, John R. Hershey, Aren Jansen, and Daniel P. W. Ellis. "Improving Universal Sound Separation Using Sound Classification." IEEE International Conference on Acoustics Speech and Signal Processing (ICASSP), 2020.

Scott Wisdom, Hakan Erdogan, Daniel P. W. Ellis, Romain Serizel, Nicolas Turpault, Justin Salamon, Eduardo Fonesca, John R. Hershey, "What's All the FUSS About Free Universal Sound Separation Data?", 2020, in preparation.

R. Gao and K. Grauman "Co-Separating Sounds of Visual Objects." In Proceedings of the International Conference on Computer Vision (ICCV), Seoul, Korea, Nov. 2019.

Jansen, Aren, Daniel PW Ellis, Shawn Hershey, R. Channing Moore, Manoj Plakal, Ashok C. Popat, and Rif A. Saurous. "Coincidence, Categorization, and Consolidation: Learning to Recognize Sounds with Minimal Supervision." In ICASSP 2020-2020 IEEE International Conference on Acoustics, Speech and Signal Processing (ICASSP), IEEE, 2020, pp. 121-125.

Efthymios Tzinis, Scott Wisdom, Aren Jansen, Shawn Hershey, Tai Remez, Daniel p. W. Ellis, John R. Hershey, "Into the Wild with AudioScope: Unsupervised Audio-Visual Separation of On-Screen Sounds," Published as a Conference Paper at ICLR, 2021, pp. 1-27.

* cited by examiner

Inference Phase

810 Receiving, by a computing device, an audio waveform associated with a plurality of video frames 820 Estimating, by a neural network, one or more audio sources associated with the plurality of video frames 830 Generating, by the neural network, one or more audio embeddings corresponding to the one or more estimated audio sources 840 Determining, by the neural network and based on the one or more audio embeddings and a video embedding, whether one or more audio sources of the one or more estimated audio sources correspond to objects in the plurality of video frames 850 Predicting, by the neural network and based on the one or more audio embeddings and the video embedding, a version of the audio waveform comprising audio sources that correspond to objects in the plurality of video frames

FIG. 8

AUDIO-VISUAL SEPARATION OF ON-SCREEN SOUNDS BASED ON MACHINE LEARNING MODELS

CROSS-REFERENCE TO RELATED DISCLOSURE

This application is a continuation of U.S. patent application Ser. No. 17/214,186, filed Mar. 26, 2021, which is incorporated herein by reference in its entirety.

BACKGROUND

Many modern computing devices, including mobile phones, personal computers, and tablets, include image capture devices, such as video cameras. The image capture devices can capture videos, such as videos that include people, animals, landscapes, and/or objects. The captured videos can also include audio that can correspond to on-screen or off-screen entities such as people, animals, landscapes, and/or objects.

Some image capture devices and/or computing devices can correct or otherwise modify captured videos to enhance an audio content. For example, some image capture devices can provide correction that removes artifacts such as speech distortion, bandwidth reduction, elimination and/or suppression of certain frequency bands, and so forth. After a captured video has been corrected, the corrected video can be saved, displayed, transmitted, and/or otherwise utilized.

SUMMARY

In one aspect, a computing device may be configured to separate arbitrary sounds in a video, and associate the sounds with on-screen sources, when appropriate. Accordingly, sound from certain sources can be enhanced, whereas sounds from other sources can be suppressed. Powered by a system of machine-learned components, the image capture device may be configured to enable users to enhance audio content in the video.

In some aspects, mobile devices may be configured with these features so that a video can be enhanced in real-time. In some instances, a video may be automatically enhanced by the mobile device. In other aspects, mobile phone users can non-destructively enhance a video to match their preference. Also, for example, pre-existing videos in a user's image library can be enhanced based on techniques described herein.

Accordingly, disclosed herein is a neural network that separates audio sources in an input audio mixture to identify associated audio sources in the video content (e.g., on-screen audio sources). In some instances, the neural network can extract a time-invariant embedding (e.g., pooled across time embeddings) for each estimated audio source and associate it with spatio-temporal locations of a low-level video embedding. The network can also extract a time-invariant high-level representation of the input video frames. Finally, the neural network can estimate a coincidence of each separated source and use probabilities of such coincidences to compute an estimated on-screen audio waveform.

In one aspect, a computer-implemented method is provided. The method includes receiving, by a computing device, an audio waveform associated with a plurality of video frames. The method further includes estimating, by a neural network, one or more audio sources associated with the plurality of video frames. The method also includes generating, by the neural network, one or more audio embeddings corresponding to the one or more estimated audio sources. The method further includes determining, by the neural network and based on the one or more audio embeddings and a video embedding, whether one or more audio sources of the one or more estimated audio sources correspond to objects in the plurality of video frames. The method also includes predicting, by the neural network and based on the one or more audio embeddings and the video embedding, a version of the audio waveform comprising audio sources that correspond to objects in the plurality of video frames.

In another aspect, a computing device is provided. The computing device includes one or more processors and data storage. The data storage has stored thereon computer-executable instructions that, when executed by one or more processors, cause the computing device to carry out operations. The operations include receiving, by the computing device, an audio waveform associated with a plurality of video frames. The operations further include estimating, by a neural network, one or more audio sources associated with the plurality of video frames. The operations further include generating, by the neural network, one or more audio embeddings corresponding to the one or more estimated audio sources. The operations further include determining, by the neural network and based on the one or more audio embeddings and a video embedding, whether one or more audio sources of the one or more estimated audio sources correspond to objects in the plurality of video frames. The operations also include predicting, by the neural network and based on the one or more audio embeddings and the video embedding, a version of the audio waveform comprising audio sources that correspond to objects in the plurality of video frames.

In another aspect, an article of manufacture is provided. The article of manufacture includes one or more computer readable media having computer-readable instructions stored thereon that, when executed by one or more processors of a computing device, cause the computing device to carry out operations. The operations include receiving, by the computing device, an audio waveform associated with a plurality of video frames. The operations further include estimating, by a neural network, one or more audio sources associated with the plurality of video frames. The operations further include generating, by the neural network, one or more audio embeddings corresponding to the one or more estimated audio sources. The operations further include determining, by the neural network and based on the one or more audio embeddings and a video embedding, whether one or more audio sources of the one or more estimated audio sources correspond to objects in the plurality of video frames. The operations also include predicting, by the neural network and based on the one or more audio embeddings and the video embedding, a version of the audio waveform comprising audio sources that correspond to objects in the plurality of video frames.

In another aspect, a system is provided. The system includes means for receiving, by a computing device, an audio waveform associated with a plurality of video frames; means for estimating, by a neural network, one or more audio sources associated with the plurality of video frames; means for generating, by the neural network, one or more audio embeddings corresponding to the one or more estimated audio sources; means for determining, by the neural network and based on the one or more audio embeddings and a video embedding, whether one or more audio sources of the one or more estimated audio sources correspond to objects in the plurality of video frames; and means for predicting, by the neural network and based on the one or more audio embeddings and the video embedding, a version of the audio waveform comprising audio sources that correspond to objects in the plurality of video frames.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 8 is a flowchart of a method, in accordance with example embodiments.

DETAILED DESCRIPTION

Figure 1:
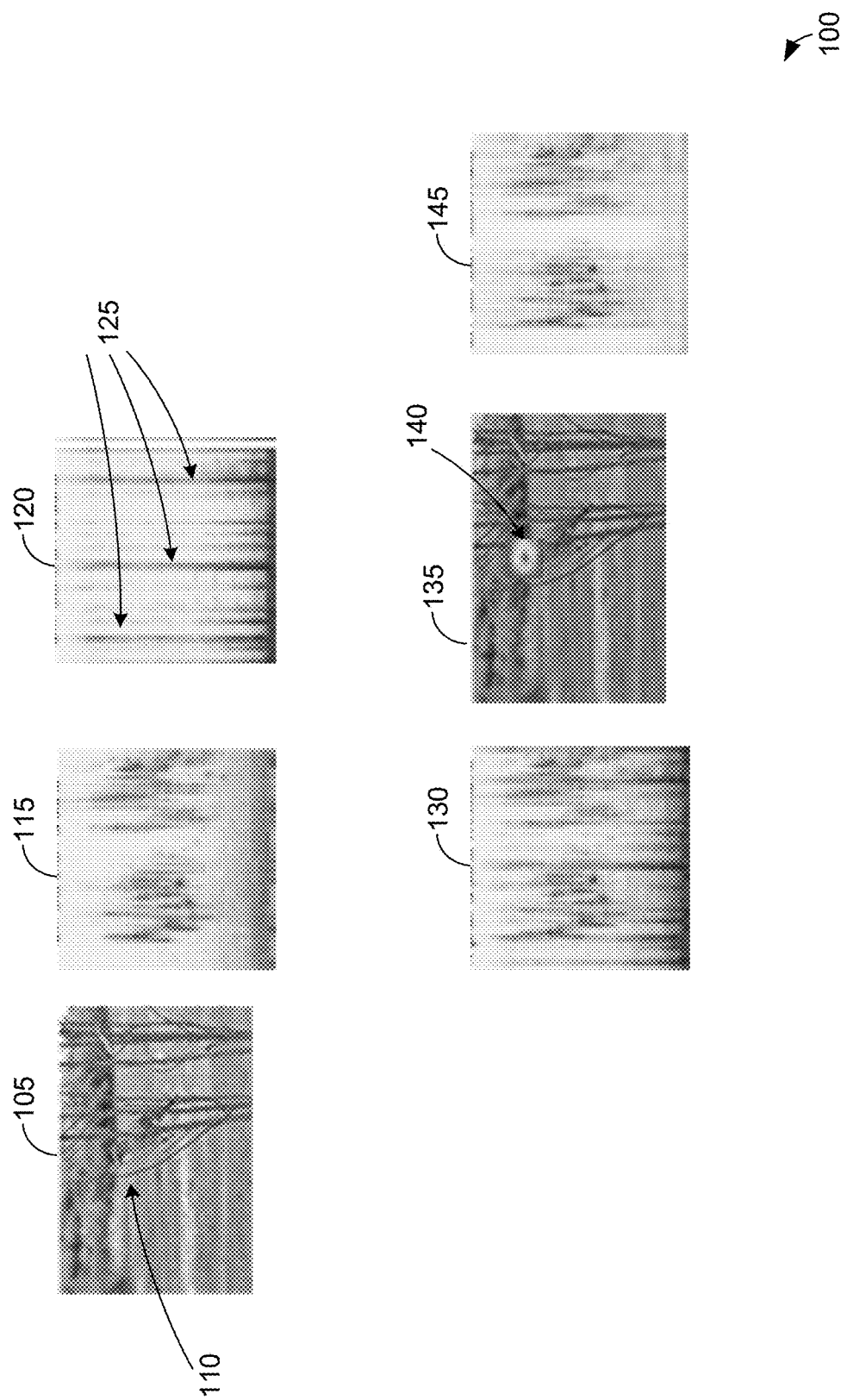
FIG. 1 illustrates an example separation of on-screen and off-screen sounds in video content, in accordance with example embodiments.

Advances in large-scale deep learning has led to significant advances in audio-visual machine perception in recent years. A particular subject of interest is the interplay in human perception between auditory and visual perception. Human understanding of the world is based on parsing the world into the objects that are the sources of audio and visual signals that can be perceived. However, the audio and visual signals produced by these sources may have different and/or complementary properties. Objects may make sounds intermittently, whereas their visual appearance can be persistent. Also, for example, visual percepts of different objects tend to be spatially distinct, whereas sound signals from different sources can blend together into a single signal, thereby making it difficult to separately perceive the individual sources of sound. Accordingly, it can be desirable in some contexts or applications to align audio and visual percepts. For example, if audio signals can be separated and associated with visual objects, then sound emanating from a particular visual can be selectively enhanced. Example embodiments disclosed herein relate to a solution for training an unsupervised, open-domain, audio-visual on-screen separation system, without reliance on prior class labels or classifiers.

In some aspects, to allow user control of video enhancement features, the herein-described techniques apply a model based on a neural network to adjust audio of video content. The herein-described techniques include receiving an input video and predicting an output video that enhances audio associated with on-screen or off-screen audio sources. The neural network separates the audio sources and applies attention pooling to the input video to associate the separated audio sources with on-screen objects, and generates an output video based on enhancement of audio content for audio from these on-screen objects. In some examples, a trained model of the neural network can work on a variety of computing devices, including but not limited to, mobile computing devices (e.g., smart phones, tablet computers, cell phones, laptop computers), stationary computing devices (e.g., desktop computers), and server computing devices.

A neural network can be trained using a training data set of in-the-wild videos to perform one or more aspects as described herein. In some examples, the neural network can be arranged as an encoder/decoder neural network.

In one example, a copy of the trained neural network can reside on a mobile computing device. The mobile computing device can include a camera that can capture an input video. A user of the mobile computing device can view the input video and determine that an audio of the input video should be enhanced. The user can then provide the input video to the trained neural network residing on the mobile computing device. In response, the trained neural network can generate a predicted output video that shows the separated sources appearing on-screen, and the user can indicate (e.g., by selecting a source as the video is presented) that audio from one or more of such sources is to be enhanced.

Accordingly, the mobile computing device can enhance the input video as indicated by the user and subsequently output the output video (e.g., provide the output video for display by the mobile computing device). In other examples, the trained neural network is not resident on the mobile computing device; rather, the mobile computing device provides the input video and the information on how the input video should be modified to a remotely-located trained neural network (e.g., via the Internet or another data network). The remotely-located neural network can process the input video and the information on how the input video should be modified as indicated above and provide an output video that shows the input video modified as indicated by the user to the mobile computing device. In other examples, non-mobile computing devices can also use the trained neural network to modify video, including videos that are not captured by a camera of the computing device.

In some examples, the trained neural network can work in conjunction with other neural networks (or other software) and/or be trained to recognize whether audio associated with an input video is to be corrected. Then, upon a determination that an input video is to be corrected, the herein-described trained neural network could apply a separation network and an attention pooling mechanism to the video, thereby correcting the audio associated with the input video. The corrective features of the audio can be chosen based on user input and/or be predetermined. For example, a user can use audio enhancement features (e.g., an equalizer, a bass boost) of the computing device to adjust an audio associated with an on-screen object in the video.

As such, the herein-described techniques can improve videos by applying more desirable and/or selectable audio enhancements to videos, thereby enhancing their actual and/or perceived quality. Enhancing the actual and/or perceived quality of videos can therefore provide benefits by making videos look better. These techniques are flexible, and so can apply a wide variety of audio enhancements to videos that include arbitrary sound sources.

Introduction and Overview

Utilizing vision as an interface for audio processing can be a powerful means to enhance audio in a video content. For example, desired sounds can be selectively preserved, while unwanted sounds can be suppressed. In some tasks, such as speech enhancement, the desired sounds can be selected by an associated class, such as, for example, speech versus non-speech. In an open-domain setting, a selection of desired sounds can be at a user's discretion. This can present a user-interface problem in selecting sources in an efficient way using audio. However, the user-interface problem can be simplified in the audio-visual case if video selection is used as a proxy for audio selection. For example, sounds from on-screen objects can be selectively enhanced, and off-screen sounds can be suppressed and/or eliminated. Generally, in the domain of videos, it may be difficult to pre-determine sounds that may be deemed to be of interest.

Associating arbitrary sounds with corresponding visual objects is a challenging problem in an open domain. Some of the challenges can include a need for a large amount of training data in order to cover all possible sounds. Another challenge may be that supervised methods require labeled examples where isolated on-screen sounds are known. However, in such instances, data collection and/or labeling burden can limit the amount and quality of available data. In some instances, an unsupervised approach using mixture invariant training (MixIT) can be utilized to learn to separate individual sources from in-the-wild videos, where the on-screen and off-screen sounds are unknown.

Another challenge may be that different audio sources can correspond to a dynamic set of on-screen objects in arbitrary spatial locations. This challenge may be overcome by utilizing an approach based on attention mechanisms, where the attention mechanisms align each hypothesized audio source with different spatial and temporal positions of corresponding objects in the video. Another challenge may be to determine which audio sources appear on screen, in an absence of strong labels. This challenge may be overcome, for example, by utilizing a weakly trained classifier for audio sources based on audio and video embeddings produced by the attention mechanism.

In some instances, separation of arbitrary sounds from a mixture, known as "universal sound separation," may be achieved for a fixed number of sounds. Conditional information about which sound classes are present can improve separation performance. Availability of the Free Universal Sound Separation (FUSS) dataset has expanded the scope to separate a variable number of sounds, which can then be used to handle more realistic data. Also, for example, specific sound classes may be extracted from input sound mixtures. Such approaches typically require curated data containing isolated sounds for training, which limits their application to truly open-domain data, and introduces challenges such as, for example, annotation cost, accurate simulation of realistic acoustic mixtures, and/or biased datasets.

Some of these challenges may be overcome by replacing strong supervision of reference source signals with weak supervision labels from related modalities such as sound class, visual input, or spatial location from multi-microphone recordings. Also, for example, a mixture invariant training (MixIT) can be used, which provides a purely unsupervised source separation framework for a variable number of latent audio sources.

Although some existing techniques include a self-supervised audio-visual on-screen speech separation system based on temporal audio-visual alignment, these techniques are typically based on restrictive assumptions of a fixed number of speakers and training videos containing only on-screen sources.

Machine learning models disclosed herein do not restrict the domain of audio, such as, for example, to musical instruments or human speakers. Also, as described herein, training and testing of the machine learning models may be performed with real in-the-wild videos containing an arbitrary number of objects with no object class restrictions. Such machine learning models can deal with noisy labels (e.g. videos with no on-screen sounds), operate on a completely open-domain of in-the-wild videos, and effectively isolate sounds coming from on-screen objects.

As described herein, a solution to an extended on-screen sound separation problem is provided. For example, given any input video, one or more audio sources that constitute an input mixture can be separated, and probability scores indicative of audio-visual correspondence for each separated source can be estimated. A higher probability score is indicative of separated sources which are apparent on-screen, and a lower probability score is indicative of separated sources which are not apparent on-screen. The separated audio sources, weighted by their estimated on-screen probabilities, can be summed together to reconstruct the on-screen mixture. Since real-world videos can contain an unknown number of both on-screen and off-screen sources belonging to an undefined ontology of classes, machine learning models disclosed herein provide an effective solution to the on-screen speech separation problem.

In some example implementations, an unsupervised, open-domain, audio-visual, on-screen separation machine learning system can be trained based on real in-the-wild video data, with no requirement on modules such as object detectors that require supervised data.

Also, for example, a new dataset for the on-screen audio-visual separation task is provided. The dataset includes 1,600 hours of unlabeled videos from YAHOO FLICKR Creative Commons 100 Million (YFCC100m) dataset, and 55 hours of videos that are human-labeled for presence of on-screen and off-screen sounds.

FIG. 1 illustrates an example separation of on-screen and off-screen sounds in video content, in accordance with example embodiments. Images 100 include video frame 105 depicting a bird 110 perched on a tree. A soundtrack corresponding to the video frame includes a chirping sound made by the bird 110, the sound of a breeze, where the breeze is not visible in the video frame 105, and sounds of fireworks and human laughter, that are not visible in the video frame 105. The chirping of the bird 110 is an example of an on-screen sound, whereas the sounds of the breeze, the fireworks, and the human laughter are examples of off-screen sounds. Also, for example, whereas a separation of objects in the video as on-screen (e.g., the bird), and off-screen (e.g., breeze, laughter, fireworks) is easily discernible, the soundtrack is a mixture of sounds from both the on-screen and off-screen objects.

Image 115 is a spectrogram representing the soundtrack for on-screen sounds (e.g., chirping of bird 110). A horizontal axis of the spectrogram represents time, and the vertical axis represents frequency. As illustrated in image 115, the on-screen sounds have specific frequencies over time. Image 120 is a spectrogram representing the soundtrack for off-screen sounds (e.g., breeze, laughter, fireworks). As illustrated in image 120, the off-screen sounds have specific frequencies over time. For example, frequency spikes 125 in the frequency values correspond to the sound of the breeze, which is not visible in the video frame, but is captured by a microphone.

Image 130 is a spectrogram representing a mixture of the soundtracks for on-screen and off-screen sounds. The spectrogram in image 130 can be considered to be a superposition of the spectrogram in image 115 and the spectrogram in image 120. For example, a mixture of mixtures (MoM) can be generated by mixing the on-screen and off-screen sounds.

Image 135 is an attention map that corresponds to the video frame illustrated in image 105. The attention map indicates if a prediction of a neural network actually correlates with specific features for this video frame. Accordingly, higher attention is denoted in region 140, and captures features of on-screen sounds such as the chirping produced by the bird 110 in image 105. In some implementations of the neural network, a localization of the on-screen sounds may be generated. For example, region 140 represents a spatial location of the bird 110 in the video frame.

Image 145 is a spectrogram representing predicted on-screen sounds. As illustrated, the spectrogram in image 145 does not include the frequency spikes 125 of image 120. So the neural network described herein is able to accurately predict and remove the off-screen sounds corresponding to the breeze. It may be noted that there was no training data for the sound corresponding to the breeze. Also, a comparison of image 115 and 145 shows that although the chirping sound of the bird 110 is preserved, other background sounds are suppressed by the neural network. Additionally, a comparison of image 120 and 145 shows that other off-screen sounds are classified and removed as well.

Network Architecture

Figure 2:
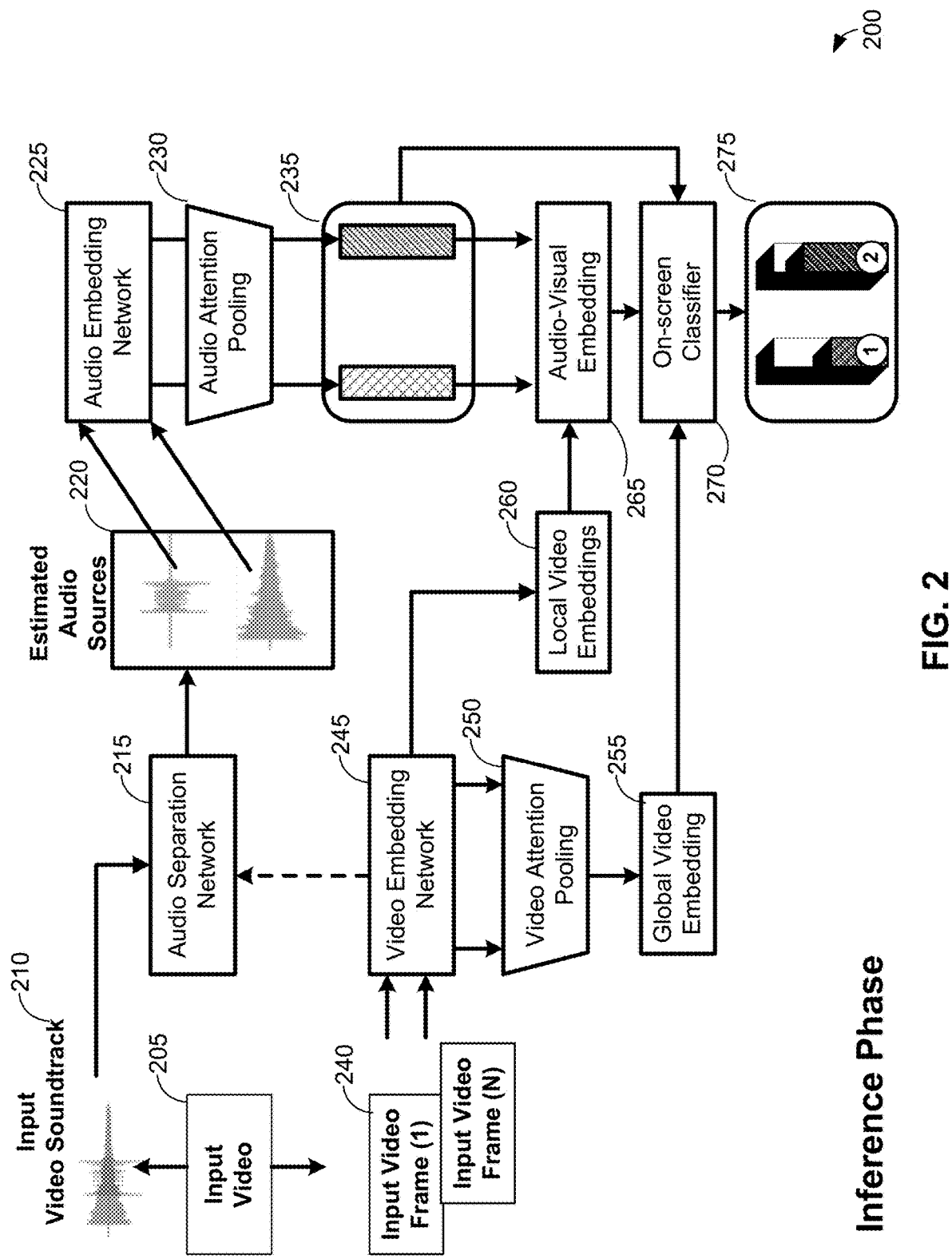
FIG. 2 is a diagram depicting an example inference phase for a neural network for separation of on-screen and off-screen sounds in video content, in accordance with example embodiments.

FIG. 2 is a diagram depicting an example inference phase for a neural network 200 for separation of on-screen and off-screen sounds in video content, in accordance with example embodiments.

In some embodiments, a computing device can receive an audio waveform and a plurality of video frames associated with video content. For example, input video 205 may be received, and input audio soundtrack 210 of input video 205 may be input to audio separation network 215. In some embodiments, neural network 200 includes an audio separation network 215 to identify one or more estimated audio sources associated with a plurality of video frames 240 in input video soundtrack 210. For example, input video soundtrack 210 may be a mixture of one or more audio tracks that comprise on-screen and off-screen soundtracks. Audio separation network 215 estimates one or more audio sources associated with the one or more audio tracks.

An example architecture for audio separation network 215 may include learnable convolutional encoder and decoder layers with an improved time-domain convolutional network (TDCN++) masking network. The TDCN++ masking network can take input video soundtrack 205 and transform it into a neural representation comprising a number of audio frames and a number of coefficients. For example, each frame of audio may be taken to be 2.5 milliseconds (ms) of audio, and each frame can be represented by a number of coefficients that capture audio features in an encoded mixture of input video soundtrack 210. Audio separation network 215 processes these coefficients and predicts a mask, which is another neural representation of the audio frame. The mask may be multiplied with the coefficients, and an inverse transform may be applied to generate a number of estimated audio sources 220.

In some implementations, a mixture consistency projection can be applied to constrain separated sources to add up to the input mixture. Audio separation network 215 may process a T-sample input mixture waveform (e.g., input video soundtrack 210) and output estimated audio sources 220. For example, M estimated audio sources, $\hat{s}_m$, m=1, ..., M, may be output as vectors of length M×T, where $\hat{s} \in R^{M \times T}$. The masking network estimates M masks which are multiplied with the activations of the encoded version of input video soundtrack 210. The final time-domain signals $\hat{s}$ may be computed by applying a decoder (e.g., a transposed convolutional layer), to the masked coefficients.

In some aspects, input video 205 may include a plurality of video frames 240, such as, for example, input video frame (1), input video frame (2), . . . , input video frame (N). The plurality of video frames 240 may be input to a video embedding network 245. Visual features may be extracted from the plurality of video frames 240. For example, a MobileNet v1 architecture may be utilized. Such an architecture can include a stacked two-dimensional (2D) separable dilated convolutional blocks with a dense layer at the end. A visual embedding model, $M^V$, may be applied independently to each of the plurality of video frames 240, where a number of video frames may be denoted by $F_V$. A static embedding $M_j^V$ can be generated for each image, where the index j ranges over the collection of the plurality of video frames 240, $\{1, \ldots, F_V\}$.

In some embodiments, embeddings of the video input, $M_j^V$, may be used to condition audio separation network 215, as indicated by a dashed arrow from video embedding network 245 to audio separation network 215. A concatenated visual embedding may be resampled, passed through a dense layer, and concatenated with all of the convolution blocks of audio separation network 215. Accordingly, in such embodiments, estimated audio sources 220 may be based on embeddings of the video input, $M_j^V$.

In some embodiments, video embedding network 245 generates global video embedding 255 comprising a global representation of video features in a plurality of video frames of the video content, and a plurality of spatio-temporal locations of the video content. For example, global video embedding 255 can be generated by applying video attention pooling 250 over the plurality of video frames 240. For example, global video embedding 255, can be represented as $V^g$=attend $(\overline{M}^V, M^V, M^V)$, where the average embedding, $\overline{M}^V$ is the query vector, and can be computed as follows:

$$\overline{M}^V = \frac{1}{F_V} \sum_j M_j^V \qquad \text{(Eqn. 1)}$$

In some embodiments, video embedding network 245 generates local video embedding 260 comprising, for each video frame of the plurality of video frames 240, a temporal representation of video features in the video frame. Local video embedding 260 is a spatio-temporal video embedding. For example, local features of a particular video frame of the plurality of video frames 240 can be extracted from an intermediate level of video embedding network 245 to generate local video embedding 260. In some aspects, local video embedding 260 can be denoted by $M_k^{V1}$, where k=(j, n) indexes video frame j at location n. Local video embeddings 260 provide spatial and temporal features in a video frame, and are utilized in identifying audio sources associated with visual objects that appear in input video 205. Spatio-temporal audio visual embedding 265 identifies such audio sources.

In some embodiments, video embedding network 245 may generate global video embedding 255 based on local video embedding 260. For example, all local features appearing across all local video embeddings may be combined to generate global video embedding 255.

In some embodiments, neural network 200 includes an audio embedding network 225 to generate an audio embedding comprising a representation of audio features in the plurality of video frames 240 of the input video 205. For each separated source m, a time-domain audio sample $ŝ_m$, m=1, ..., M, may be generated. Accordingly, a corresponding global audio embedding can be generated using a MobileNet v1 architecture for audio embedding network 225. Such an architecture can include a stacked two-dimensional (2D) separable dilated convolutional blocks with a dense layer at the end. In some implementations, audio embedding network 225 may compute log Mel-scale spectrograms with $F_a$ audio frames from the time-domain separated sources, and then apply stacks of depth-wise separable convolutions to produce a $F_a \times N$ embedding matrix $M^a$, which contains an N-dimensional row embedding for each frame.

In some embodiments, neural network 200 includes an audio attention pooling operation 225 that can be applied to generate a time-varying audio embedding. For example, audio attention pooling operation 225 can be applied to each separated source $ŝ_m$ to form an audio embedding, $Z_m$=attend$(\overline{M}_m^a, M_m^a, M_m^a)$, where the average embedding, $M_m^a$, is the query vector for source $ŝ_m$, and can be computed as follows:

$$M_m^a = \frac{1}{F_a} \sum_i M_{m,i}^a \quad \text{(Eqn. 2)}$$

The attention mechanism can be defined as:

$$\text{attend}(q, K, V) = \alpha^T f_V(V), \quad \text{(Eqn. 3)}$$

where α can be defined as:

$$\alpha = \text{softmax}(f_K(K) f_q(q)^T), \quad \text{(Eqn. 4)}$$

where q denotes a query vector, α denotes an attention weight distribution column vector, K denotes a key matrix, V denotes a value matrix, and $f_q$, $f_V$, $f_K$ denote trainable row-wise dense layers, with conforming dimensions. Audio attention pooling 230 can be applied to generate one or more audio embeddings (e.g., audio embedding 235), which comprises an audio representation for each estimated audio source 220. For example, audio embedding 235 comprises two audio representations, one for each of the two estimated audio sources 220.

Generally, attention pooling cannot be applied directly to the estimated audio sources. Accordingly, audio embedding vectors are first generated for each estimated audio source, using a second neural network. These audio embeddings form a time series. Attention pooling is used to derive a second audio embedding that summarizes the time series of audio embeddings. Likewise, a video embedding network can be used to generate a set of video embeddings corresponding to different spatial and temporal positions in the video.

The one or more audio embeddings are then used in an attention operation over the video embedding to determine weights over one or more spatio-temporal positions in the plurality of video frames. Using these weights, a video embedding is extracted that corresponds to each audio embedding. The resulting embeddings are used to determine whether one or more audio sources of the one or more estimated audio sources corresponds to objects in the plurality of video frames.

For example, in order to accurately predict whether one or more audio sources of the one or more estimated audio sources correspond to objects in the plurality of video frames 240 in input video 205, audio and visual information may be combined. This allows for an identification of sources that correspond to objects in input video 205. Accordingly, an audio-visual spatio-temporal attention scheme may be utilized by letting neural network 200 attend to local features of the visual embeddings for each separated source. In some embodiments, based on audio embedding 235 and local video embeddings 260 for the plurality of video frames 240, an audio-visual embedding 265 is generated. For example, audio embedding 235, previously referred to as $Z_m$, can be used as a query input for an audio source, and key and value inputs may be obtained from local video embeddings 260, $M^{V1}$. Accordingly, spatio-temporal audio-visual embedding 265 may be extracted for a source m, as $$R_m = \text{attend}(q, K, V) = \text{attend}(Z_m, M^{V1}, M^{V1}) \quad \text{(Eqn. 5)}$$

On-screen classifier 270 may infer a visual presence of a separated source in input video 205 by concatenating global video embedding 255, previously referred to as $V^g$, global audio embedding 235 for each source m, previously referred to as $Z_m$, and spatio-temporal audio-visual embedding 265, previously referred to as $R_m$. The concatenated vector may be passed via a dense layer with a logistic activation, such as, for example, $ŷ_m$=logistic ([$V^g$, $Z_m$, $R_m$]). For example, classifier 270 outputs a probability score for each estimated audio source 220 individually, and assigns a value between 0 and 1. The probability score is indicative of a likelihood that a given estimated audio source corresponds to an on-screen sound or an off-screen sound. A higher probability is indicative of a higher likelihood that the given estimated audio source corresponds to an on-screen sound, whereas a lower probability is indicative of a higher likelihood that the given estimated audio source corresponds to an off-screen sound. Accordingly, classifier 270 generates labels 275 indicative of whether a given estimated audio source corresponds to an on-screen sound or an off-screen sound.

In some implementations, a threshold probability score may indicate whether a given estimated audio source corresponds to an on-screen sound or an off-screen sound. For example, a probability score that exceeds the threshold probability score is indicative of an on-screen source, whereas a probability score that does not exceed the threshold probability score is indicative of an off-screen source. Generally, the threshold probability score may depend on a number of factors, such as, for example, audio and/or video features, such as a type of sound, a type of video, a type of source, a quality of audio, a quality of video, and so forth. Also, for example, in some implementations, all separated audio sources in a given video may be associated with one threshold probability score. In some other implementations, more than one threshold probability score may be used for a given video. Also, for example, the threshold probability score may be a learnable parameter of a neural network (e.g., neural network 200).

In some embodiments, based on whether a particular audio source of the one or more estimated audio sources correspond to objects in the plurality of video frames, the computing device can modify an audio content of a particular audio track associated with the particular audio source.

Then the computing device can modify the video content based on the modified audio content. For example, referring again to FIG. 1, upon a determination that a separated audio source (e.g., a soundtrack for a chirping sound) corresponds to the bird 110 in image 105, the computing device can enhance this audio source. Also, for example, upon a determination that a separated audio source (e.g., sound of the breeze, sound of fireworks, and so forth) does not correspond to an object that appears in image 105, the computing device can suppress this audio source. Once the audio is modified, it can be mixed in to recreate a mixture of soundtracks, and the computing device can provide the modified video content using the computing device.

In some embodiments, the computing device (e.g., a mobile device) can determine a request to identify on-screen audio sources in the plurality of video frames. Then, the computing device (e.g., a mobile device) can send the request to identify the on-screen audio sources from the computing device (e.g., a mobile device) to a second computing device (e.g., a cloud server). The second computing device (e.g., a cloud server) can include a trained version of the neural network. Subsequently, the computing device (e.g., a mobile device) can receive, from the second computing device (e.g., a cloud server), the determining of whether the one or more audio sources of the one or more estimated audio sources correspond to objects in the plurality of video frames. Then, the computing device (e.g., a mobile device) can output the version of the waveform comprising the identified on-screen audio sources based on the received determination of whether the one or more audio sources of the one or more estimated audio sources correspond to objects in the plurality of video frames.

In some embodiments, the computing device can include a camera and generate the video content using the camera. Then, the computing device can receive the generated video content from the camera.

In some embodiments, the computing device can obtain a trained neural network. Then, the computing device can predict the version of the audio waveform comprising the audio sources that correspond to objects in the plurality of video frames by predicting using the trained neural network.

In some embodiments, the computing device can identify a portion of an image in the video content. For example, the video may capture a person playing a musical instrument in a crowded marketplace. Accordingly, the computing device can identify a portion of the video that corresponds to the person playing the musical instrument. Then, the computing device can determine that a particular audio source of the one or more estimated audio sources corresponds to a particular object in the identified portion of the video content. For example, the video of the crowded marketplace may include human speech, vehicular sounds, and/or other sounds generally associated with a marketplace. Accordingly, the computing device can separate the audio sources, identify the audio track corresponding to the musical instrument being played, and associate the audio track with the person playing the musical instrument. Subsequently, the computing device can modify an audio content corresponding to the particular audio source. For example, the computing device can suppress sounds corresponding to human speech, vehicular traffic, and/or other sounds in the marketplace, and/or enhance the audio track corresponding to the musical instrument.

In some implementations, the camera may zoom in on a particular object, and the computing device may correspondingly enhance an audio track that is associated with the particular object. In some implementations, the computing device may suppress audio tracks that are not associated with the particular object.

In some implementations, the computing device may be a mechanical robot, and the camera may be associated with a robotic vision component of the robot. Accordingly, as the robot detects objects in its visual field, audio tracks from these objects may be separated and selectively enhanced.

An interactive user experience may be provided where a user can adjust an audio content for a video. This provides additional creative flexibility to users to find their own balance between sounds emanating from different audio sources. For example, when the video captures a conversation between two individuals, the computing device can separate the audio sources (e.g., each individual as an audio source), and associate audio tracks with the two separated audio sources. A user may be presented, via an interactive graphical user interface, with a modified video content where the two identified individuals may be selectable. A user may indicate selection of one individual, and the computing device may enhance the audio track corresponding to the selected individual, and/or suppress the audio track corresponding to the other individual. Also, for example, aspects of video enhancement can be applied to existing videos from a user's photo library.

Neural network 200 can be a fully-convolutional neural network as described herein. During training, neural network 200 can receive as inputs one or more input training videos. Neural network 200 can include layers of nodes for processing input video. Example layers can include, but are not limited to, input layers, convolutional layers, activation layers, pooling layers, and output layers. Input layers can store input data, such as pixel data of a video frame of input video and inputs from other layers of neural network 200. Convolutional layers can compute an output of neurons connected to local regions in the input. In some examples, the predicted outputs can be fed back into the neural network 200 again as input to perform iterative refinement. Activation layers can determine whether or not an output of a preceding layer is "activated" or actually provided (e.g., provided to a succeeding layer). Pooling layers can downsample the input. For example, neural network 200 can involve one or more pooling layers downsampling the input by a predetermined factor (e.g., a factor of two) in the horizontal and/or vertical dimensions. Output layers can provide an output of neural network 200 to software and/or hardware interfacing with neural network 200; e.g. to hardware and/or software used to display, print, communicate and/or otherwise provide an enhanced video.

Training Losses

Figure 3:
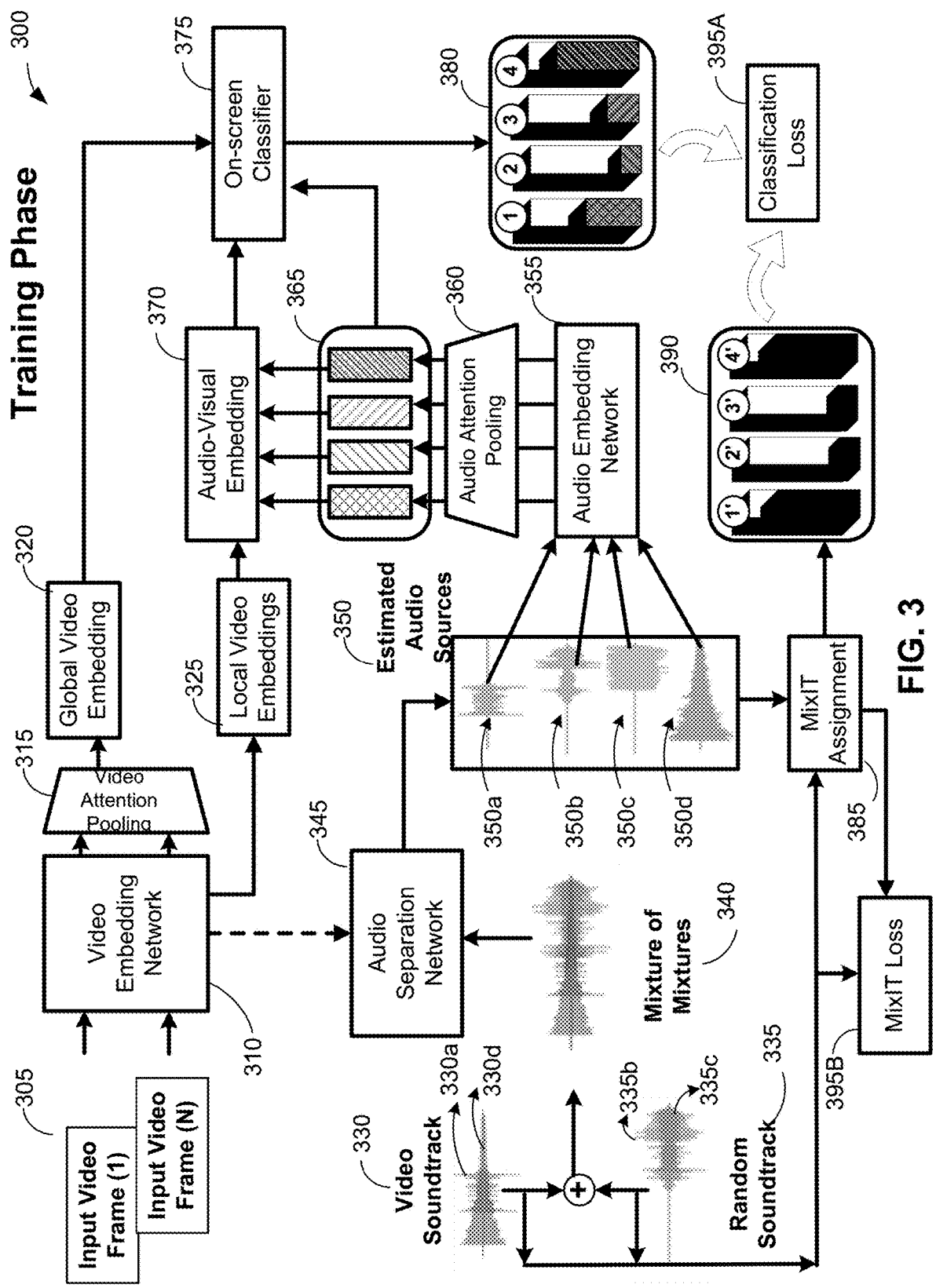
FIG. 3 is a diagram depicting an example training phase for a neural network for separation of on-screen and off-screen sounds in video content, in accordance with example embodiments.

FIG. 3 is a diagram depicting an example training phase for a neural network for separation of on-screen and off-screen sounds in video content, in accordance with example embodiments. In some implementations, neural network 300 can be trained to receive a particular audio waveform associated with a particular plurality of video frames and predict a version of the particular audio waveform comprising particular audio sources that correspond to particular objects in the particular plurality of video frames. For example, a video soundtrack 330 can be mixed with a random soundtrack 335 to form a Mixture of Mixtures (MoM) 340. For purposes of illustration, video soundtrack 330 may be composed of two audio tracks 330a and 330d. Likewise, random soundtrack 335 may be composed of audio tracks such as 335b and 335c. One or more of video soundtrack 330 and random soundtrack 335 may include additional audio tracks. Some audio tracks may be filtered out during pre-processing, and so forth. MoM 340 may be input into audio separation network 345. Audio separation network 345 may share one or more aspects in common with audio separation network 215.

Audio separation network 345 may separate MoM 340 into estimated audio sources 350. As indicated, estimated audio sources 350 may include four separate audio tracks 350$a$ (corresponding to 330$a$), 350$b$ (corresponding to 335$b$), 350$c$ (corresponding to 335$c$), and 350$d$ (corresponding to 330$d$).

Each separated audio track from estimated audio sources 350 may be input to audio embedding network 355. Audio embedding network 355 may share one or more aspects in common with 225. By applying audio attention pooling 360, as described herein, audio embedding network 355 may generate global audio embedding 365, where each audio track 350$a$, 350$b$, 350$c$ and 350$d$ from estimated audio sources 350 corresponds to a respective, separate audio embedding.

In some aspects, input video may include a plurality of video frames 305, such as, for example, input video frame (1), input video frame (2), . . . , input video frame (N). The plurality of video frames 305 may be input to video embedding network 310. Video embedding network 310 may share one or more aspects in common with video embedding network 245. Visual features may be extracted from the plurality of video frames 305. For example, a MobileNet v1 architecture may be utilized. Such an architecture can include a stacked two-dimensional (2D) separable dilated convolutional blocks with a dense layer at the end. A visual embedding model, $M^V$, may be applied independently to each of the plurality of video frames 305, where a number of video frames may be denoted by $F_V$. A static embedding $M_j^V$ can be generated for each image, where the index $j$ ranges over the collection of the plurality of video frames 240, $\{1, \ldots, F_V\}$.

In some embodiments, embeddings of the video input, $M_j^V$, may be used to condition audio separation network 345, as indicated by a dashed arrow from video embedding network 310 to audio separation network 345. A concatenated visual embedding may be resampled, passed through a dense layer, and concatenated with all convolution blocks of audio separation network 345. Accordingly, in such embodiments, estimated audio sources 350 may be based on embeddings of the video input, $M_j^V$.

In some embodiments, video embedding network 310 generates global video embedding 320 comprising a global representation of video features in a plurality of video frames of the video content, and a plurality of spatio-temporal locations of the video content. For example, global video embedding 320 can be generated by applying video attention pooling 315 over the plurality of video frames 305.

In some embodiments, video embedding network 310 generates local video embeddings 325 comprising, for each video frame of the plurality of video frames 305, a temporal representation of video features in the video frame. Local video embeddings 325 provide spatial and temporal features in a video frame, and are utilized in identifying audio sources associated with visual objects that appear in input video.

In order to accurately predict whether one or more separated audio sources associated with the one or more audio tracks in MoM 340 correspond to objects in input video, audio and visual information may be combined. This allows for an identification of sources that correspond to objects in input video. Accordingly, an audio-visual spatio-temporal attention scheme may be utilized by letting neural network 300 attend to local features of the visual embeddings for each separated source. In some embodiments, based on global audio embedding 365 and local video embeddings 325 for the plurality of video frames 305, spatio-temporal audio-visual embedding 370 is generated.

An on-screen classifier 375 may predict whether one or more audio sources associated with the one or more audio tracks (e.g., audio track 350$a$, 350$b$, 350$c$ and 350$d$) correspond to objects in the video content. On-screen classifier 375 may infer a visual presence of a separated source in input video by concatenating global video embedding 320, global audio embedding 355, and spatio-temporal audio-visual embedding 370. The concatenated vector may be passed via a dense layer with a logistic activation. For example, classifier 375 outputs a probability score for each estimated audio source 350 individually, and assigns a value between 0 and 1. The probability score is indicative of a likelihood that a given estimated audio source corresponds to an on-screen sound or an off-screen sound. A higher probability is indicative of a higher likelihood that the given estimated audio source corresponds to an on-screen sound, whereas a lower probability is indicative of a higher likelihood that the given estimated audio source corresponds to an off-screen sound. Accordingly, classifier 375 generates labels 380 indicative of whether a given estimated audio source corresponds to an on-screen sound or an off-screen sound.

As illustrated, audio tracks 350$a$ and 350$d$ may be associated with relatively higher probability scores, as indicated by labels 1 and 4 in labels 380. Similarly, audio tracks 350$b$ and 350$c$ may be associated with relatively lower probability scores, as indicated by labels 2 and 3 in labels 380. Accordingly, neural network 300 predicts that audio tracks 350$a$ and 350$d$ correspond to on-screen sources. In this example, this is consistent with the input audio, since audio tracks 350$a$ and 350$d$ correspond to audio tracks 330$a$ and 330$d$ in video soundtrack 330. Also, as illustrated, lower relative probability scores indicate that neural network 300 predicts that audio tracks 350$b$ and 350$c$ correspond to off-screen sources. In this example, this is consistent with the input audio, since audio tracks 350$b$ and 350$c$ correspond to audio tracks 335$b$ and 335$c$ in random soundtrack 335.

It may be noted that a correspondence of audio tracks 350$a$ and 350$d$ to audio tracks 330$a$ and 330$d$ in video soundtrack 330 is not necessarily sufficient to conclude that audio tracks 350$a$ and 350$d$ correspond to on-screen sources. For example, audio track 330$a$ may correspond to an audio track from a musical instrument being played by an individual that appears in the video, and audio track 330$d$ may correspond to an audio track from an airplane that can be heard in the video, but does not physically appear in the video. In this example, neural network 300 may associate audio track 330$a$ with a high probability score (it is in video soundtrack 330 and is associated with an on-screen source), and neural network 300 may associate audio track 330$d$ with a low probability score (it is in video soundtrack 330 and is associated with an off-screen source).

In some implementations, the training of neural 300 network includes unsupervised mixture invariant training (MixIT). In FIG. 3, blocks 330-350, and 385 can be performed without video embeddings. In particular, blocks 330-350, and 385 describe the MixIT training, which only relies on audio information. For example, estimated audio sources 350 may be input to MixIT Assignment 385, which may, in turn, generate pseudo-labels 390 indicative of a likelihood that a given estimated audio source corresponds to an on-screen sound or an off-screen sound. As indicated, pseudo-labels 1' and 4' are indicative of on-screen sounds (higher probability scores) and pseudo-labels 2' and 3' are indicative of off-screen sounds (lower probability scores). Generally, a comparison of pseudo-labels 390 and labels 380 may be utilized to train neural network 300.

In some implementations, neural network 300 can be trained with a MixIT loss 395B, which measures fidelity between sums of separated sources (e.g., estimated audio sources 350) specified by the MixIT assignment (e.g., MixIT assignment 385) and reference mixtures (e.g., video soundtrack 330 and random soundtrack 335). For example, MixIT separation loss 395B may be utilized to optimize an assignment of M estimated audio sources, $\hat{s}=M_s(x_1+x_2)$, to two reference mixtures $x_1$ and $x_2$ as follows:

$$L_{sep}(x_1,x_2,\hat{s})=(L_{SNR}(x_1,[A\hat{s}]_1)+L_{SNR}(x_2,[A\hat{s}]_2)),\qquad\text{(Eqn. 6)}$$

where a mixing matrix $A \in B^{2 \times M}$ is constrained to a set of 2×M binary matrices, where each column adds up to 1. Due to the constraints on A, each source $\hat{s}_m$ can only be assigned to one reference mixture.

The SNR loss, $L_{SNR}$, for an estimated signal $\hat{t} \in \mathbb{R}^n$ and a target signal $t \in \mathbb{R}^n$ is defined as:

$$L_{SNR}(t,\hat{t})=10(\|t-\hat{t}\|^2+10^{-3}\|t\|^2)\qquad\text{(Eqn. 7)}$$

In some implementations, classifier 375 of neural network 300 can be trained based on a difference between the one or more estimated audio sources and the one or more predicted audio sources. For example, in some implementations, the classification loss 395A can be based on an exact binary cross entropy loss function. An exact binary cross entropy loss function, $L_{exact}$, may utilize a binary label, $y_m$, for each source m. For example, for unsupervised training, he exact binary cross entropy loss function may be provided by MixIT assignment 385 as follows:

$$L_{exact}=\sum_{m=1}^{M}(-y_m\log(\hat{y}_m)+(y_m-1)\log(1-\hat{y}_m))\qquad\text{(Eqn. 8)}$$

In some implementations, classifier 375 of neural network 300 can be trained based on a particular estimated audio source of the one or more estimated audio sources, where the particular estimated audio source has a high likelihood of corresponding to an object in the video content. For example, in some implementations, a classification loss can be based on a multiple instance (MI) cross entropy. Since some separated sources assigned to the on-screen mixture may not be on-screen, a multiple-instance cross entropy loss function may be utilized as a more robust loss function. For example, the multiple-instance cross entropy loss function, $L_{MI}$, may be minimized over a set of positive labels R={m|$y_m$=1, m∈{1, . . . , M}}, and may be provided as follows:

$$L_{MI}=-\log(\hat{y}_m)-\sum_{m'\notin R}\log(1-\hat{y}_{m'})\qquad\text{(Eqn. 9)}$$

In some implementations, classifier 375 of neural network 300 can be trained based on active combinations (AC) cross entropy. AC cross entropy may be may be utilized as an alternative to MI cross entropy, and can be used to minimize a loss over all settings $\wp_{\geq 1}$ (R) of labels, where at least one of the labels is positive. The AC cross entropy, $L_{AC}$, may be provided as follows:

$$L_{AC}=-\sum_{m\in A}\log(\hat{y}_m)-\sum_{m'\notin A}\log(1-\hat{y}_{m'})\qquad\text{(Eqn. 10)}$$

Additional and/or alternative loss functions may be utilized to train neural network 300.

Neural networks described herein may be trained on, for example, the Yahoo Flickr Creative Commons 100 Million Dataset (YFCC100m). This dataset is useful for real-world audio-visual recording environments for an open-domain system such as the systems described herein. The dataset consists of about 200,000 videos (comprising 2,500 hours) of various lengths, and covers a diverse range of semantic sound categories. In one training implementation, 5-second clips with a hop size of 1 second may be extracted, resulting in around 7.2 million clips. For example, the clips may include a 5-second audio waveform sampled at 16 kHz and 5 video frames $x^{(f)}$, where each frame can be an RGB image of size 128×128×3.

In some aspects, unsupervised training may be applied to the neural networks described herein. In one example implementation, training may be performed on a subset of the YFCC100m dataset. Such a subset may be selected to reduce a proportion of videos that do not include on-screen sounds. Accordingly, a filtered subset D f of the YFCC100m dataset may be generated to include clips with a high audio-visual coincidence probability predicted by an unsupervised audio-visual coincidence prediction model, where such a model can be trained on labeled data, such as, for example, sounds from a collection of human-labeled clips (e.g., 10-second clips) based on YOUTUBE videos. In some aspects, the resulting selection may be noisy, since the coincidence model may not be accurate, and clips that have high audio-visual coincidence may contain both on-screen and off-screen sounds, no on-screen sounds, and so forth. However, presence of on-screen sounds may be improved in the filtered dataset.

In one example implementation, the filtered dataset D f may include all clips extracted based on a high audio-visual coincidence score. For example, videos corresponding to the highest 36,000 audio-visual coincidence score may be used. A threshold for filtering may be determined empirically to maintain a good representation of diverse videos, while ensuring that not too many clips with only off-screen sounds are accepted. In some embodiments, performance of the unsupervised filtering, and/or performance of the neural network models described herein may be evaluated. In one instance, some supervised data may be used to evaluate performance. For example, 10,000 unfiltered training clips, 10,000 filtered training clips, and 10,000 filtered validation/test clips may be used to obtain human annotations. In the annotation process, labels may be added to the video clips to indicate whether on-screen or off-screen sounds are present or not present. In some instances, each clip may be labeled independently by multiple (e.g., 3) individual raters, and a final label (e.g., on-screen or off-screen) may be applied to a clip when the labels from all raters match.

In some embodiments, the audio embedding network and/or the visual embedding network may be pre-trained on AUDIOSET for unsupervised coincidence prediction. In some embodiments, the audio separation network may be trained using MixIT, and based on mixtures of mixtures (MoMs) constructed from the audio of the training dataset. In some implementations, models may be trained on 4 Google Cloud TPUs (16 chips) with an Adam optimizer, a batch size of 256, and a learning rate of $10^{-4}$.

In some implementations, a training dataset for the training of the neural network can include in-the-wild videos. In order to train the neural network, 1,600 hours of unlabeled video-clips may be used, and mini batches of video clips with MoMs may be constructed as audio. For example, a first mixture in these MoMs may be one of four types: (1) noisy-labeled on-screen clips (NOn MoM), (2) synthetic off-screen-only clips (SOff MoM), (3) human-labeled on-screen-only clips (LOn MoM), and (4) human-labeled off-screen-only clips (LOff MoM).

Also, for example, a second mixture in the MoM may be audio drawn from a different random video in filtered data. A NOn MoM may use video clip frames and audio from a filtered high-coincidence subset $D_f$. SOff MoMs may be constructed by combining video frames of a filtered clip with random audio drawn from another filtered video. Unsupervised training mini batches may include 0% or 25% SOff MoM examples, and the remaining examples may be NOn MoMs.

Semi-supervised mini batches may include examples of LOn and LOff MoMs. Such MoMs may be constructed in a manner similar to a construction of NOn MoMs, except that the first mixture is drawn from unanimously human-labeled on-screen-only videos, and unanimously human-labeled off-screen-only videos, respectively. In some example implementations, 50% of the LOn and LOff examples in the batch can be MoMs, and the other half can be single mixtures (i.e., the video with just its original soundtrack, and without additional background audio). These "single mixtures" can be treated as a MoM example where the second mixture is all-zeros.

Evaluations may utilize human-labeled test videos that have been unanimously labeled as containing either only on-screen or only off-screen sounds. Using this data, four evaluation sets may be constructed: (1) on-screen single mixtures, (2) off-screen single mixtures, (3) on-screen MoMs, and (4) off-screen MoMs. A single mixture evaluation may include data drawn from a particular label, either on-screen or off-screen. Each on-screen (resp. off-screen) MoM may include an on-screen-only (resp. off-screen-only) video clip, mixed with an audio from another random clip, and drawn from the off-screen-only examples.

Detection performance for the on-screen classifier may be measured using an area under the curve of the receiver operator characteristic (AUC-ROC). Ambiguous classification decisions, such as, for example, those caused by inactive separated sources and/or separated sources with a very low volume of sound, may be minimized and/or eliminated by using a weight for each source signal's prediction equal to a linear power ratio between the powers of the source and the input MoM. For single mixture evaluations, positive labels can be assumed for all separated sources that are estimated from on-screen-only mixtures, and negative labels can be assumed for all separated sources from off-screen-only mixtures. For on-screen MoM evaluations, labels for separated sources from on-screen MoMs can be assigned using a first row of an oracle MixIT mixing matrix, and classifier outputs for sources separated from off-screen MoMs can be assigned negative labels.

Since training of the neural networks may be based on in-the-wild videos, there may be no ground truth references sources. MoMs may be the only reference sources. Accordingly, an estimate of the on-screen audio may be determined based on a weighted average of separated sources, where the weights are based on prediction probabilities. For example, the estimate of the on-screen audio, $\hat{x}^{on}$, may be determined as follows:

$$\hat{x}^{on} = \sum_{m=1}^{M} p_m \hat{s}_m. \qquad \text{(Eqn. 11)}$$

where $p_m$ is a prediction probability corresponding to source $\hat{s}_m$. Also, for example, for instances with on-screen single mixture and MoM evaluations, a scale invariant signal to noise ratio (SI-SNR) may be determined between the estimate of the on-screen audio, $\hat{x}^{on}$, and a reference on-screen only mixture $x^{(on)}$. Generally, SI-SNR measures the fidelity between a target t and an estimate $\hat{t}$. This may be measured within an arbitrary scale factor in units of decibels, as follows:

$$SI = SNR(t, \hat{t}) = 10 \frac{\|\alpha t\|^2}{\|\alpha t - \hat{t}\|^2} \qquad \text{(Eqn. 12)}$$

$$\alpha = \arg\min_\alpha \|\alpha t - \hat{t}\|^2 = t^T \frac{\hat{t}}{\|t\|^2}$$

In some implementations, the computing device may determine an off-screen suppression ratio (OSR) to measure a degree to which off-screen audio is correctly rejected and/or suppressed. The OSR is a ratio in decibels of a power of the input MoM to a power of an on-screen estimate, $\hat{x}^{on}$. In some instances, OSR may be computed for training samples where the input MoM includes only off-screen audio. Generally, a higher value of OSR is indicative of a greater suppression of off-screen audio. A lowest possible value for OSR is 0 decibels (dB), which indicates that the on-screen estimate, $\hat{x}^{on}$ matches the input MoM. In this case, all on-screen probabilities output by a classifier have value 1.

In some instances, SI-SNR and/or OSR may have an infinite value. For example, when $\hat{y}=0$, the logarithm in Eqn. 12 yields a value of $-\infty$, and so SI-SNR is $-\infty$ dB. This situation may occur, for example, when an input SNR of an on-screen mixture in a MoM is very low, and a MixIT assignment does not assign any separated source to the initial MoM. Also, for example, if pseudo-labels match the predicted labels, then SI-SNR can output a value of $+\infty$ dB. Such a value can be realized in evaluation cases that include an on-screen single mixture, and where separated audio sources add up to an on-screen input due to mixture consistency of a separation network. Also, for example, OSR can be infinite for off-screen audio when off-screen audio is correctly suppressed by outputting $\hat{x}^{on}=0$. Values such as 0, $-\infty$, and $+\infty$ for SI-SNR and/or OSR may be avoided by computing median values for SI-SNR and/or OSR.

In some implementations, there may be a trade-off between preservation of on-screen sounds, as measured by SI-SNR, and suppression of off-screen sounds, as measured by OSR. For example, a higher value for on-screen SI-SNR on on-screen examples generally corresponds to lower values for OSR on off-screen examples. Also, for example, different classification losses may have different operating points. For example, for MoMs, compared to using an exact cross-entropy loss, neural networks trained with AC cross entropy or MI cross entropy, may achieve a lower value for on-screen SI-SNR, while achieving a higher value for OSR, thereby indicating an increased suppression of off-screen sounds. Also, for example, exact cross-entropy models may achieve a higher AUC-ROC for single mixtures and MoMs, and achieve a higher reconstruction of on-screen single mixtures at an expense of a lower rejection of off-screen single mixtures.

Generally, training of neural networks based noisy labels provided by the unsupervised coincidence model may achieve a lower AUC-ROC value compared to the semi-supervised condition that adds a small amount of human-labeled examples, as described herein. Also, for example, semi-supervised and unsupervised training of neural networks may achieve comparable on-screen SI-SNR; however, semi-supervised models may achieve higher off-screen suppression rates. In some implementations, using 25% synthetic off-screen examples can modify the behavior of semi-supervised models by biasing them towards predicting lower probabilities of on-screen audio. Such a bias results in a lower on-screen SI-SNR and a much larger OSR, thereby indicating high off-screen rejection.

Training Machine Learning Models for Generating Inferences/Predictions

Figure 4:
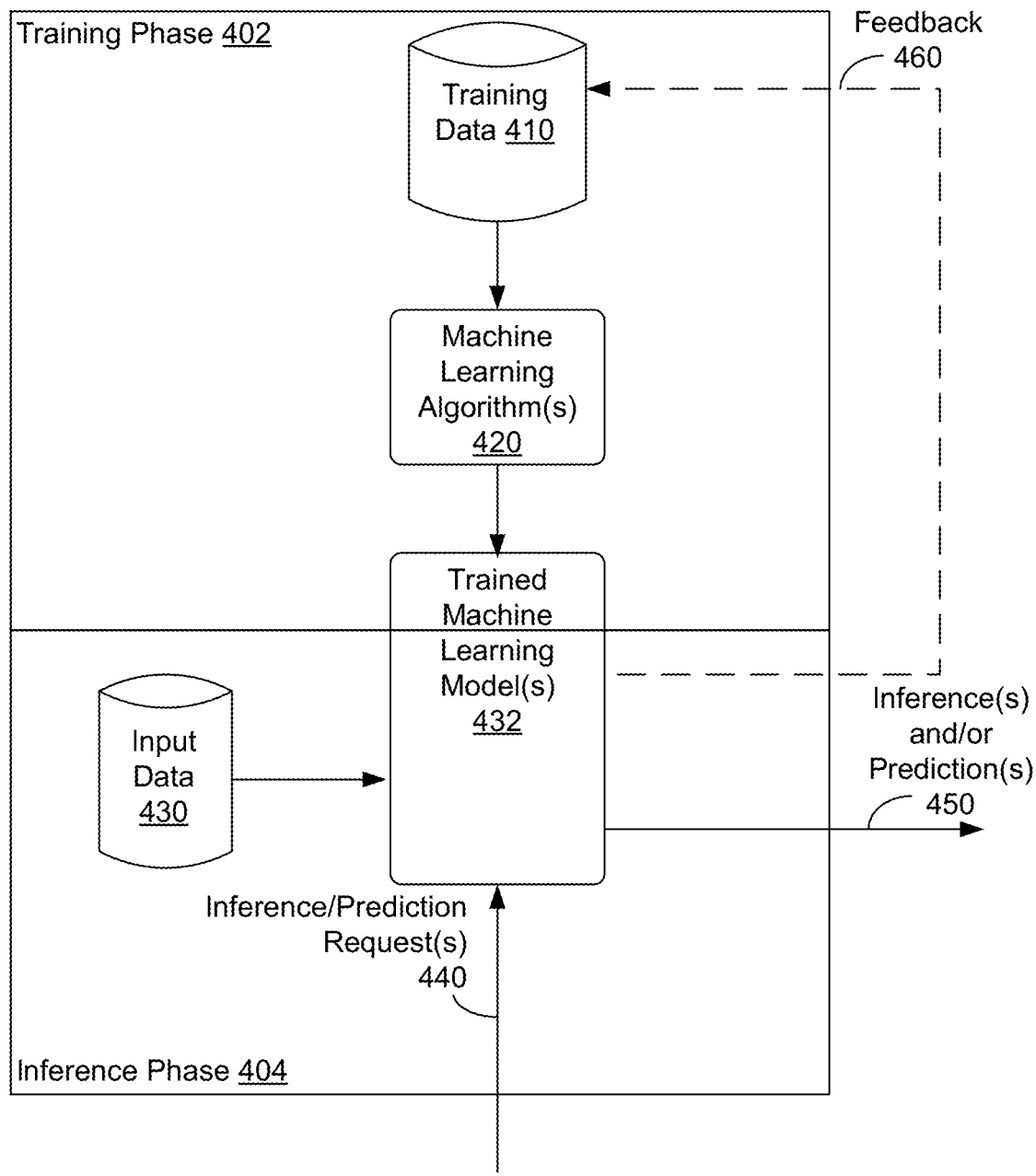
FIG. 4 is a diagram illustrating training and inference phases of a machine learning model, in accordance with example embodiments.

FIG. 4 shows diagram 400 illustrating a training phase 402 (e.g., as illustrated in FIG. 3) and an inference phase 404 (e.g., as illustrated in FIG. 2) of trained machine learning model(s) 432, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be termed as a trained machine learning model. For example, FIG. 4 shows training phase 402 where one or more machine learning algorithms 420 are being trained on training data 410 to become trained machine learning model 432. Then, during inference phase 404, trained machine learning model 432 can receive input data 430 (e.g., MoM) and one or more inference/prediction requests 440 (perhaps as part of input data 430) and responsively provide as an output one or more inferences and/or predictions 450 (e.g., predict whether a separated source corresponds to on-screen or off-screen audio).

As such, trained machine learning model(s) 432 can include one or more models of one or more machine learning algorithms 420. Machine learning algorithm(s) 420 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 420 may be supervised or unsupervised, and may implement any suitable combination of online and offline learning.

In some examples, machine learning algorithm(s) 420 and/or trained machine learning model(s) 432 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 420 and/or trained machine learning model(s) 432. In some examples, trained machine learning model(s) 432 can be trained, reside and execute to provide inferences on a particular computing device, and/or otherwise can make inferences for the particular computing device.

During training phase 402, machine learning algorithm(s) 420 can be trained by providing at least training data 410 as training input using unsupervised, supervised, semi-supervised, and/or weakly supervised learning techniques. Unsupervised learning involves providing a portion (or all) of training data 410 to machine learning algorithm(s) 420 and machine learning algorithm(s) 420 determining one or more output inferences based on the provided portion (or all) of training data 410. Supervised learning involves providing a portion of training data 410 to machine learning algorithm(s) 420, with machine learning algorithm(s) 420 determining one or more output inferences based on the provided portion of training data 410, and the output inference(s) are either accepted or corrected based on correct results associated with training data 410. In some examples, supervised learning of machine learning algorithm(s) 420 can be governed by a set of rules and/or a set of labels for the training input, and the set of rules and/or set of labels may be used to correct inferences of machine learning algorithm(s) 420.

Semi-supervised learning involves having correct labels for part, but not all, of training data 410. During semi-supervised learning, supervised learning is used for a portion of training data 410 having correct results, and unsupervised learning is used for a portion of training data 410 not having correct results. In some examples, machine learning algorithm(s) 420 and/or trained machine learning model(s) 432 can be trained using other machine learning techniques, including but not limited to, incremental learning and curriculum learning.

In some examples, machine learning algorithm(s) 420 and/or trained machine learning model(s) 432 can use transfer learning techniques. For example, transfer learning techniques can involve trained machine learning model(s) 432 being pre-trained on one set of data and additionally trained using training data 410. More particularly, machine learning algorithm(s) 420 can be pre-trained on data from one or more computing devices and a resulting trained machine learning model provided to a particular computing device, where the particular computing device is intended to execute the trained machine learning model during inference phase 404. Then, during training phase 402, the pre-trained machine learning model can be additionally trained using training data 410, where training data 410 can be derived from kernel and non-kernel data of the particular computing device. This further training of the machine learning algorithm(s) 420 and/or the pre-trained machine learning model using training data 410 of the particular computing device's data can be performed using either supervised or unsupervised learning. Once machine learning algorithm(s) 420 and/or the pre-trained machine learning model has been trained on at least training data 410, training phase 402 can be completed. The trained resulting machine learning model can be utilized as at least one of trained machine learning model(s) 432.

In particular, once training phase 402 has been completed, trained machine learning model(s) 432 can be provided to a computing device, if not already on the computing device. Inference phase 404 can begin after trained machine learning model(s) 432 are provided to the particular computing device.

During inference phase 404, trained machine learning model(s) 432 can receive input data 430 and generate and output one or more corresponding inferences and/or predictions 450 about input data 430. As such, input data 430 can be used as an input to trained machine learning model(s) 432 for providing corresponding inference(s) and/or prediction(s) 450 to kernel components and non-kernel components. For example, trained machine learning model(s) 432 can generate inference(s) and/or prediction(s) 450 in response to one or more inference/prediction requests 440. In some examples, trained machine learning model(s)

432 can be executed by a portion of other software. For example, trained machine learning model(s) 432 can be executed by an inference or prediction daemon to be readily available to provide inferences and/or predictions upon request. Input data 430 can include data from the particular computing device executing trained machine learning model(s) 432 and/or input data from one or more computing devices other than the particular computing device.

Input data 430 can include a collection of video clips provided by one or more sources. The collection of video clips can include sounds corresponding to various objects.

Inference(s) and/or prediction(s) 450 can include audio and/or video embeddings, predictions, estimated audio sources, and/or other output data produced by trained machine learning model(s) 432 operating on input data 430 (and training data 410). In some examples, trained machine learning model(s) 432 can use output inference(s) and/or prediction(s) 450 as input feedback 460. Trained machine learning model(s) 432 can also rely on past inferences as inputs for generating new inferences.

Neural networks 200, 300, can be examples of machine learning algorithm(s) 420. After training, the trained version of neural networks 200, 300, can be examples of trained machine learning model(s) 432. In this approach, an example of inference/prediction request(s) 440 can be a request to predict whether separated audio sources correspond to on-screen or off-screen audio, and a corresponding example of inferences and/or prediction(s) 450 can be an output indicating separated sources associated with on-screen sounds, and separated sources associated with off-screen sounds. In some examples, a given computing device can include the trained neural network 200, perhaps after training neural network 300. Then, the given computing device can receive requests to predict whether audio is associated with on-screen sounds, and use the trained neural network to generate a prediction of on-screen sounds.

In some examples, two or more computing devices can be used to provide output predictions of on-screen and off-screen sounds; e.g., a first computing device can generate and send requests to predict whether audio is associated with on-screen sounds to a second computing device. Then, the second computing device can use the trained versions of neural networks, perhaps after training, to generate a prediction of on-screen sounds, and respond to the requests from the first computing device for the prediction of on-screen sounds. Then, upon reception of responses to the requests, the first computing device can provide the requested output (e.g., using a user interface and/or a display, a printed copy, an electronic communication, etc.).

Example Data Network

Figure 5:
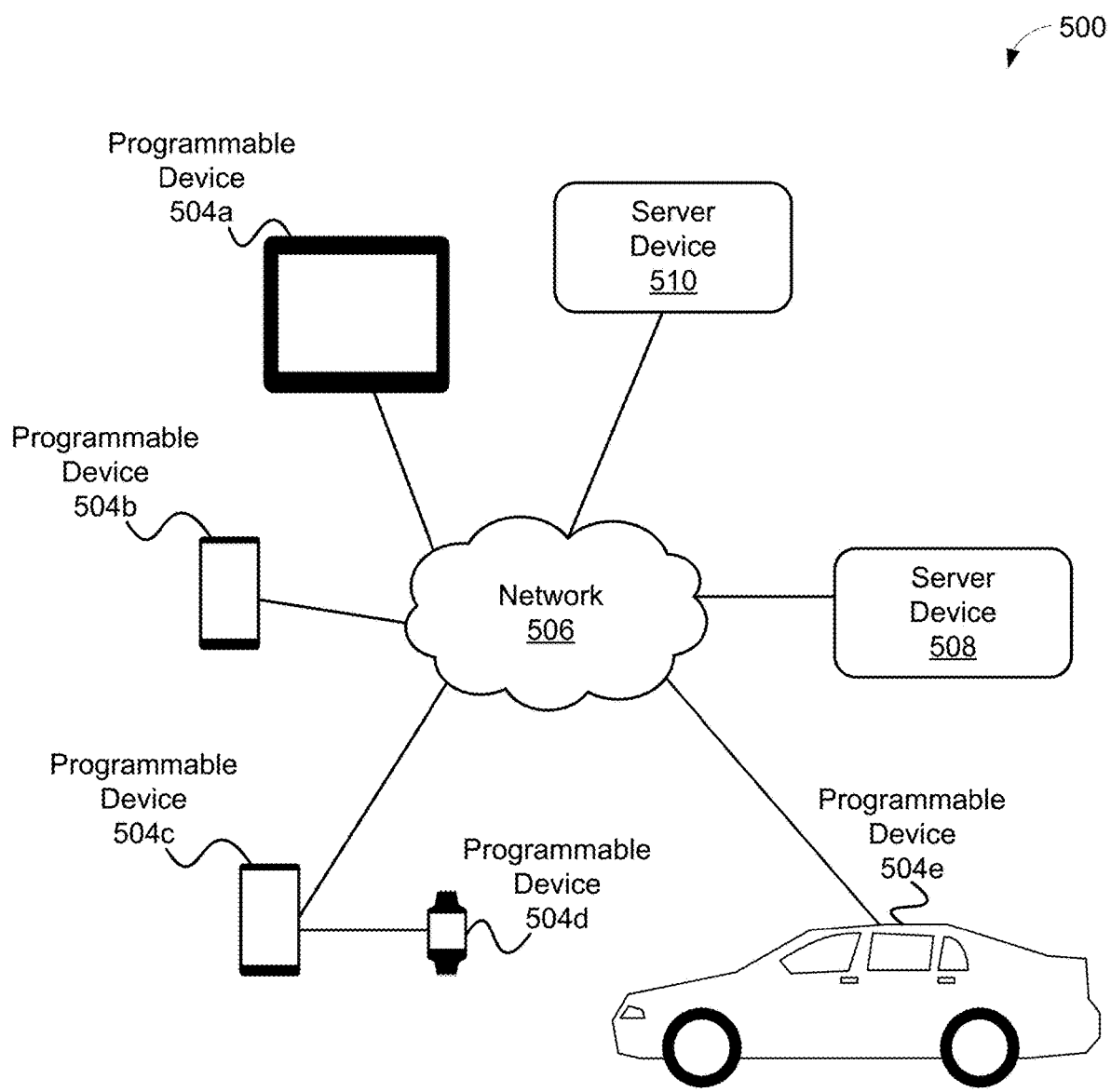
FIG. 5 depicts a distributed computing architecture, in accordance with example embodiments.

FIG. 5 depicts a distributed computing architecture 500, in accordance with example embodiments. Distributed computing architecture 500 includes server devices 508, 510 that are configured to communicate, via network 506, with programmable devices 504a, 504b, 504c, 504d, 504e. Network 506 may correspond to a local area network (LAN), a wide area network (WAN), a WLAN, a WWAN, a corporate intranet, the public Internet, or any other type of network configured to provide a communications path between networked computing devices. Network 506 may also correspond to a combination of one or more LANs, WANs, corporate intranets, and/or the public Internet.

Although FIG. 5 only shows five programmable devices, distributed application architectures may serve tens, hundreds, or thousands of programmable devices. Moreover, programmable devices 504a, 504b, 504c, 504d, 504e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 504a, 504b, 504c, 504e, programmable devices can be directly connected to network 506. In other examples, such as illustrated by programmable device 504d, programmable devices can be indirectly connected to network 506 via an associated computing device, such as programmable device 504c. In this example, programmable device 504c can act as an associated computing device to pass electronic communications between programmable device 504d and network 506. In other examples, such as illustrated by programmable device 504e, a computing device can be part of and/or inside a vehicle, such as a car, a truck, a bus, a boat or ship, an airplane, etc. In other examples not shown in FIG. 5, a programmable device can be both directly and indirectly connected to network 506.

Server devices 508, 510 can be configured to perform one or more services, as requested by programmable devices 504a-504e. For example, server device 508 and/or 510 can provide content to programmable devices 504a-504e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 508 and/or 510 can provide programmable devices 504a-504e with access to software for database, search, computation, graphical, audio, video, World Wide Web/Internet utilization, and/or other functions. Many other examples of server devices are possible as well.

Computing Device Architecture

Figure 6:
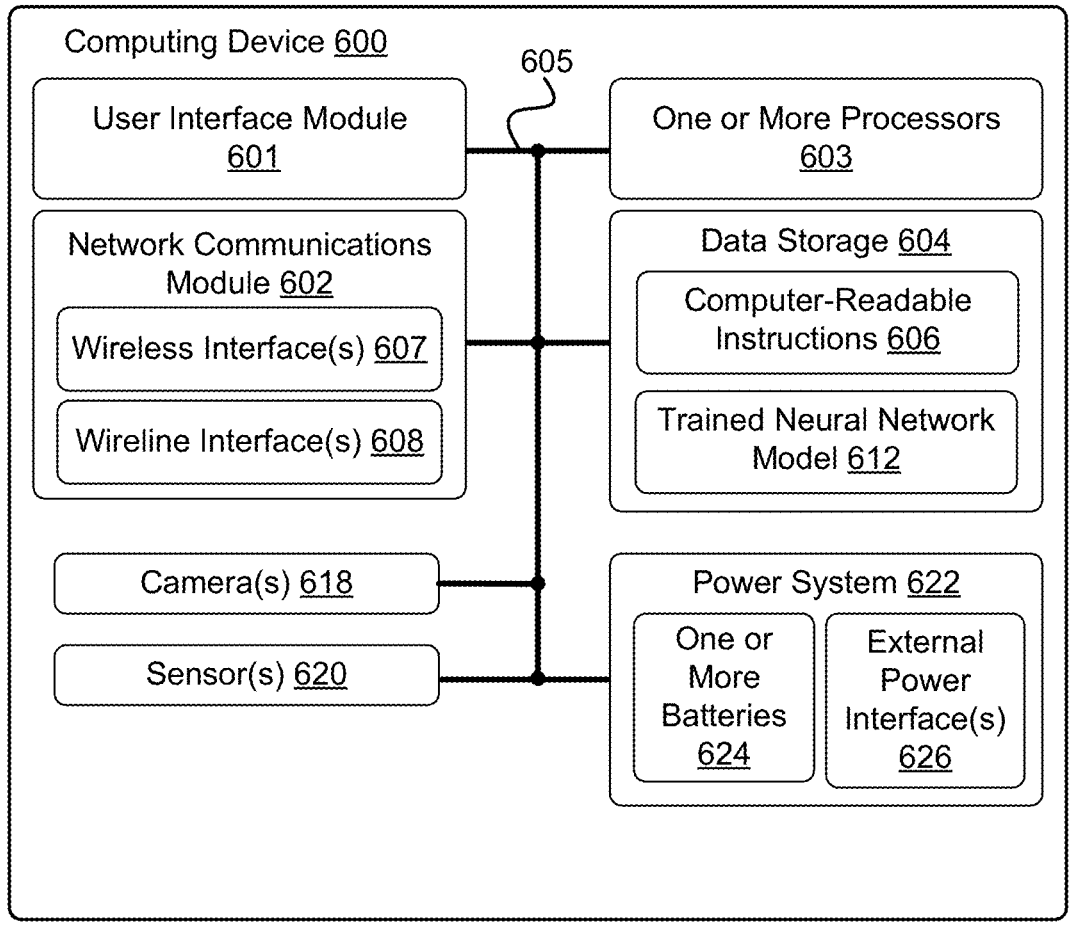
FIG. 6 is a block diagram of a computing device, in accordance with example embodiments.

FIG. 6 is a block diagram of an example computing device 600, in accordance with example embodiments. In particular, computing device 600 shown in FIG. 6 can be configured to perform at least one function of and/or related to neural networks 200, 300, and/or method 800.

Computing device 600 may include a user interface module 601, a network communications module 602, one or more processors 603, data storage 604, one or more cameras 618, one or more sensors 620, and power system 622, all of which may be linked together via a system bus, network, or other connection mechanism 605.

User interface module 601 can be operable to send data to and/or receive data from external user input/output devices. For example, user interface module 601 can be configured to send and/or receive data to and/or from user input devices such as a touch screen, a computer mouse, a keyboard, a keypad, a touch pad, a trackball, a joystick, a voice recognition module, and/or other similar devices. User interface module 601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 601 can also be configured to generate audible outputs, with devices such as a speaker, speaker jack, audio output port, audio output device, earphones, and/or other similar devices. User interface module 601 can further be configured with one or more haptic devices that can generate haptic outputs, such as vibrations and/or other outputs detectable by touch and/or physical contact with computing device 600. In some examples, user interface module 601 can be used to provide a graphical user interface (GUI) for utilizing computing device 600. For example, user interface module 601 can be used to provide selectable objects in a video, where the selectable objects are identified as sources of on-screen audio. Also, for example, user interface module 601 can be used to receive user input indicating selection of an on-screen object.

Network communications module 602 can include one or more devices that provide one or more wireless interfaces 607 and/or one or more wireline interfaces 608 that are configurable to communicate via a network. Wireless interface(s) 607 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 602 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 603 can include one or more general purpose processors, and/or one or more special purpose processors (e.g., digital signal processors, tensor processing units (TPUs), graphics processing units (GPUs), application specific integrated circuits, etc.). One or more processors 603 can be configured to execute computer-readable instructions 606 that are contained in data storage 604 and/or other instructions as described herein.

Data storage 604 can include one or more non-transitory computer-readable storage media that can be read and/or accessed by at least one of one or more processors 603. The one or more computer-readable storage media can include volatile and/or non-volatile storage components, such as optical, magnetic, organic or other memory or disc storage, which can be integrated in whole or in part with at least one of one or more processors 603. In some examples, data storage 604 can be implemented using a single physical device (e.g., one optical, magnetic, organic or other memory or disc storage unit), while in other examples, data storage 604 can be implemented using two or more physical devices.

Data storage 604 can include computer-readable instructions 606 and perhaps additional data. In some examples, data storage 604 can include storage required to perform at least part of the herein-described methods, scenarios, and techniques and/or at least part of the functionality of the herein-described devices and networks. In some examples, data storage 604 can include storage for a trained neural network model 612 (e.g., a model of trained neural networks such as neural network 200). In particular of these examples, computer-readable instructions 606 can include instructions that, when executed by processor(s) 603, enable computing device 600 to provide for some or all of the functionality of trained neural network model 612.

In some examples, computing device 600 can include one or more cameras 618. Camera(s) 618 can include one or more image capture devices, such as still and/or video cameras, equipped to capture videos. The one or more images can be one or more images utilized in video imagery. Camera(s) 618 can capture light and/or electromagnetic radiation emitted as visible light, infrared radiation, ultraviolet light, and/or as one or more other frequencies of light.

In some examples, computing device 600 can include one or more sensors 620. Sensors 620 can be configured to measure conditions within computing device 600 and/or conditions in an environment of computing device 600 and provide data about these conditions. For example, sensors 620 can include one or more of: (i) sensors for obtaining data about computing device 600, such as, but not limited to, a thermometer for measuring a temperature of computing device 600, a battery sensor for measuring power of one or more batteries of power system 622, and/or other sensors measuring conditions of computing device 600; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 600, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 600, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 600, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 620 are possible as well.

Power system 622 can include one or more batteries 624 and/or one or more external power interfaces 626 for providing electrical power to computing device 600. Each battery of the one or more batteries 624 can, when electrically coupled to the computing device 600, act as a source of stored electrical power for computing device 600. One or more batteries 624 of power system 622 can be configured to be portable. Some or all of one or more batteries 624 can be readily removable from computing device 600. In other examples, some or all of one or more batteries 624 can be internal to computing device 600, and so may not be readily removable from computing device 600. Some or all of one or more batteries 624 can be rechargeable. For example, a rechargeable battery can be recharged via a wired connection between the battery and another power supply, such as by one or more power supplies that are external to computing device 600 and connected to computing device 600 via the one or more external power interfaces. In other examples, some or all of one or more batteries 624 can be non-rechargeable batteries.

One or more external power interfaces 626 of power system 622 can include one or more wired-power interfaces, such as a USB cable and/or a power cord, that enable wired electrical power connections to one or more power supplies that are external to computing device 600. One or more external power interfaces 626 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 626, computing device 600 can draw electrical power from the external power source the established electrical power connection. In some examples, power system 622 can include related sensors, such as battery sensors associated with the one or more batteries or other types of electrical power sensors.

Cloud-Based Servers

Figure 7:
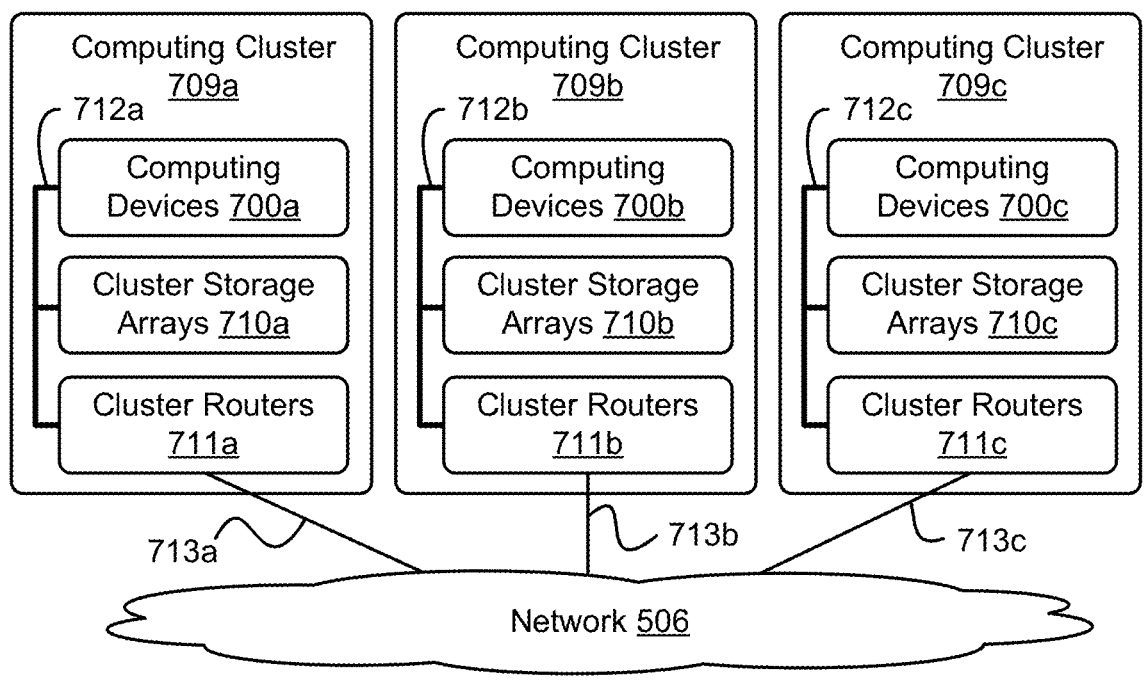
FIG. 7 depicts a network of computing clusters arranged as a cloud-based server system, in accordance with example embodiments.

FIG. 7 depicts a network 506 of computing clusters 709a, 709b, 709c arranged as a cloud-based server system in accordance with an example embodiment. Computing clusters 709a, 709b, 709c can be cloud-based devices that store program logic and/or data of cloud-based applications and/or services; e.g., perform at least one function of and/or related to neural networks 200, 300, and/or method 800.

In some embodiments, computing clusters 709a, 709b, 709c can be a single computing device residing in a single computing center. In other embodiments, computing clusters 709a, 709b, 709c can include multiple computing devices in a single computing center, or even multiple computing devices located in multiple computing centers located in diverse geographic locations. For example, FIG. 7 depicts each of computing clusters 709a, 709b, and 709c residing in different physical locations.

In some embodiments, data and services at computing clusters 709a, 709b, 709c can be encoded as computer readable information stored in non-transitory, tangible computer readable media (or computer readable storage media) and accessible by other computing devices. In some embodiments, computing clusters 709a, 709b, 709c can be stored on a single disk drive or other tangible storage media, or can be implemented on multiple disk drives or other tangible storage media located at one or more diverse geographic locations.

FIG. 7 depicts a cloud-based server system in accordance with an example embodiment. In FIG. 7, functionality of neural networks 200, 300, and/or a computing device can be distributed among computing clusters 709a, 709b, 709c. Computing cluster 709a can include one or more computing devices 700a, cluster storage arrays 710a, and cluster routers 711a connected by a local cluster network 712a. Similarly, computing cluster 709b can include one or more computing devices 700b, cluster storage arrays 710b, and cluster routers 711b connected by a local cluster network 712b. Likewise, computing cluster 709c can include one or more computing devices 700c, cluster storage arrays 710c, and cluster routers 711c connected by a local cluster network 712c.

In some embodiments, each of computing clusters 709a, 709b, and 709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709a, for example, computing devices 700a can be configured to perform various computing tasks of a neural network, an audio separation network, an audio embedding network, a video embedding network, a classifier, and/or a computing device. In one embodiment, the various functionalities of a neural network, an audio separation network, an audio embedding network, a video embedding network, a classifier, and/or a computing device can be distributed among one or more of computing devices 700a, 700b, 700c. Computing devices 700b and 700c in respective computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with a neural network, an audio separation network, an audio embedding network, a video embedding network, a classifier, and/or a computing device can be distributed across computing devices 700a, 700b, and 700c based at least in part on the processing requirements of a neural network, an audio separation network, an audio embedding network, a video embedding network, a classifier, and/or a computing device, the processing capabilities of computing devices 700a, 700b, 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 710a, 710b, 710c of computing clusters 709a, 709b, 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a neural network, an audio separation network, an audio embedding network, a video embedding network, a classifier, and/or a computing device can be distributed across computing devices 700a, 700b, 700c of computing clusters 709a, 709b, 709c, various active portions and/or backup portions of these components can be distributed across cluster storage arrays 710a, 710b, 710c. For example, some cluster storage arrays can be configured to store one portion of the data of a neural network, an audio separation network, an audio embedding network, a video embedding network, a classifier, and/or a computing device, while other cluster storage arrays can store other portion(s) of data of a neural network, an audio separation network, an audio embedding network, a video embedding network, a classifier, and/or a computing device. Also, for example, some cluster storage arrays can be configured to store the data of a first neural network, while other cluster storage arrays can store the data of a second and/or third neural network. Additionally, some cluster storage arrays can be configured to store backup versions of data stored in other cluster storage arrays.

Cluster routers 711a, 711b, 711c in computing clusters 709a, 709b, 709c can include networking equipment configured to provide internal and external communications for the computing clusters. For example, cluster routers 711a in computing cluster 709a can include one or more internet switching and routing devices configured to provide (i) local area network communications between computing devices 700a and cluster storage arrays 710a via local cluster network 712a, and (ii) wide area network communications between computing cluster 709a and computing clusters 709b and 709c via wide area network link 713a to network 506. Cluster routers 711b and 711c can include network equipment similar to cluster routers 711a, and cluster routers 711b and 711c can perform similar networking functions for computing clusters 709b and 709b that cluster routers 711a perform for computing cluster 709a.

In some embodiments, the configuration of cluster routers 711a, 711b, 711c can be based at least in part on the data communication requirements of the computing devices and cluster storage arrays, the data communications capabilities of the network equipment in cluster routers 711a, 711b, 711c, the latency and throughput of local cluster networks 712a, 712b, 712c, the latency, throughput, and cost of wide area network links 713a, 713b, 713c, and/or other factors that can contribute to the cost, speed, fault-tolerance, resiliency, efficiency and/or other design criteria of the moderation system architecture.

Example Methods of Operation

FIG. 8 is a flowchart of a method 800, in accordance with example embodiments. Method 800 can be executed by a computing device, such as computing device 600. Method 800 can begin at block 810, where the computing device can receive an audio waveform and a plurality of video frames associated with video content.

At block 820, the computing device can apply a neural network to estimate one or more audio sources associated with the plurality of video frames.

At block 830, the computing device can generate, by the neural network, one or more audio embeddings corresponding to the one or more estimated audio sources.

At block 840, the computing device can determine, by the neural network and based on the one or more audio embeddings and a video embedding, whether one or more audio sources of the one or more estimated audio sources correspond to objects in the plurality of video frames.

At block 850, the computing device can predict, by the neural network and based on the one or more audio embeddings and the video embedding, a version of the audio waveform comprising audio sources that correspond to objects in the plurality of video frames.

In some embodiments, responsive to determining that a particular audio source of the one or more audio sources corresponds to a particular object in the plurality of video frame, the computing device can modify an audio content associated with a particular audio source to produce a version of the audio waveform based on the modified audio content. In some embodiments, the computing device can provide the version of the audio waveform using the computing device.

In some embodiments, the neural network includes a classifier. A first attention pooling can be applied to generate the one or more audio embeddings. A second attention pooling can be applied to generate the video embedding. The determination of whether the one or more audio sources correspond to objects in the plurality of video frames can include applying the classifier based on the one or more audio embeddings and the video embedding.

In some embodiments, the neural network includes a classifier. Attentional pooling can be applied to the one or more audio embeddings and the video embedding, to produce a representation. The determination of whether the one or more audio sources correspond to objects in the plurality of video frames can include applying the classifier based on the representation.

In some embodiments, the computing device can determine a request to identify on-screen audio sources in the plurality of video frames. The computing device can send the request to identify the on-screen audio sources from the computing device to a second computing device, the second computing device comprising a trained version of the neural network. After sending the request, the computing device can receive, from the second computing device, the determination of whether the one or more audio sources of the one or more estimated audio sources correspond to objects in the plurality of video frames. The computing device can output the version of the waveform comprising the identified on-screen audio sources based on the received determination of whether the one or more audio sources of the one or more estimated audio sources correspond to objects in the plurality of video frames.

In some embodiments, the neural network can include an audio separation network to perform the generating of the one or more estimated audio sources. In such embodiments, the neural network can include an audio embedding network to generate the one or more audio embeddings based on the one or more estimated audio sources, wherein the one or more audio embeddings comprise a representation of audio features.

In some of these embodiments, the neural network can include a video embedding network to generate a global video embedding including a global representation of video features in a plurality of video frames of the video content. The video embedding network may also generate a plurality of spatio-temporal locations of the video content. In some of these embodiments, the computing device can generate, based on the one or more audio embeddings and the global video embedding, an audio-visual embedding. The determination of whether the one or more audio sources of the one or more estimated audio sources correspond to objects in the plurality of video frames can be performed based on the audio-visual embedding.

In some embodiments, the neural network can include a video embedding network to generate a local video embedding including, for each video frame of the plurality of video frames, a temporal representation of video features in the video frame. In some of these embodiments, the computing device can generate, based on the one or more audio embeddings and the local video embeddings, an audio-visual embedding. The determination of whether the one or more audio sources of the one or more estimated audio sources correspond to objects in the plurality of video frames can be performed based on the audio-visual embedding. In some embodiments, the global video embedding can be generated from the local video embeddings.

In some embodiments, the audio-visual embedding can be based on the one or more audio embeddings and the local video embeddings, and the determination of whether the one or more audio sources of the one or more estimated audio sources correspond to objects in the plurality of video frames can be performed based on the audio-visual embedding and the global video embedding.

In some embodiments, the computing device can train the neural network to receive a particular audio waveform associated with a particular plurality of video frames and predict a version of the particular audio waveform comprising particular audio sources that correspond to particular objects in the particular plurality of video frames. In such embodiments, the computing device can train the neural network by training a classifier based on a difference between the one or more estimated audio sources and one or more predicted audio sources. In some other embodiments, the computing device can train the neural network by training a classifier based on a particular estimated audio source of the one or more estimated audio sources, where the particular estimated audio source has a high likelihood of corresponding to an object in the particular plurality of video frames. In some other embodiments, the computing device can train the neural network by training a classifier based on active combinations cross entropy.

In some embodiments, the computing device can train the neural network at the computing device.

In some embodiments, the computing device can train the neural network based on unsupervised mixture invariant training.

In some embodiments, a training dataset for the training of the neural network can include in-the-wild videos.

In some embodiments, the computing device can include a camera. In such embodiments, the computing device can generate the video content using the camera. In some such embodiments, the computing device can receive the generated video content from the camera.

In some embodiments, the computing device can obtain a trained neural network at the computing device. The predicting of the version of the audio waveform comprising the audio sources that correspond to objects in the plurality of video frames can include predicting by the computing device using the trained neural network.

In some embodiments, the computing device can identify a portion of an image in the video content. Then, the computing device can determine that a particular audio source of the one or more estimated audio sources corresponds to a particular object in the identified portion of the video content. Subsequently, the computing device can modify an audio content corresponding to the particular audio source.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method, comprising:
   receiving, by a computing device, an audio waveform associated with a plurality of video frames of video content;
   determining, by a time-domain convolutional masking network of a neural network and from the audio waveform, a neural representation comprising one or more audio frames, wherein each audio frame of the one or more audio frames comprises a respective plurality of coefficients, and wherein the respective plurality of coefficients represent one or more audio features in an encoded mixture of the audio waveform;

predicting, by the neural network and based on the neural representation, one or more audio sources associated with the plurality of video frames;

modifying the one or more predicted audio sources by applying a mixture consistency projection that constrains the one or more predicted audio sources to add up to the received audio waveform; and providing, by the computing device, the modified one or more predicted audio sources.

2. The computer-implemented method of claim 1, further comprising:

predicting, for a given audio frame of the one or more audio frames, a respective mask, and wherein the predicting of the one or more audio sources comprises applying an inverse transform to a result of multiplying the respective mask with the plurality of coefficients corresponding to the given audio frame.

3. The computer-implemented method of claim 1, further comprising:

extracting, by a video embedding network, one or more visual features from each of the plurality of video frames; and generating, for each of the plurality of video frames, a video embedding based on the one or more visual features.

4. The computer-implemented method of claim 3, further comprising:

generating, by the video embedding network, a global video embedding comprising a global representation of the one or more visual features, and a plurality of spatio-temporal locations of the video content.

5. The computer-implemented method of claim 3, further comprising:

generating, by the video embedding network, a local video embedding comprising, for each video frame of the plurality of video frames, a temporal representation of the one or more visual features in the video frame.

6. The computer-implemented method of claim 5, further comprising:

generating, by the video embedding network, a global video embedding based on a plurality of local video embeddings corresponding to the plurality of video frames.

7. The computer-implemented method of claim 3, wherein the video embedding network comprises a plurality of stacked two-dimensional (2D) separable dilated convolutional blocks and a dense layer at an end of the plurality of blocks.

8. The computer-implemented method of claim 3, further comprising:

generating, by the neural network, one or more audio embeddings corresponding to the one or more predicted audio sources;

generating, by the neural network and for each audio embedding corresponding to the one or more predicted audio sources and based on the video embedding, a spatio-temporal audio-visual embedding based on an attention operation that aligns the one or more predicted audio sources with spatio-temporal positions of on-screen objects in the plurality of video frames;

determining, by the neural network and based on the spatio-temporal audio-visual embedding, whether a given audio source of the one or more estimated audio sources corresponds to an on-screen object in the plurality of video frames; and predicting, by the neural network, a version of the audio waveform comprising audio sources that correspond to the on-screen objects in the plurality of video frames.

9. The computer-implemented method of claim 8, wherein the neural network comprises a classifier, wherein a first attention operation is applied to generate the one or more audio embeddings, a second attention operation is applied to generate the video embedding, and wherein the determining of whether the given audio source corresponds to the on-screen object in the plurality of video frames comprises applying the classifier based on the one or more audio embeddings and the video embedding.

10. The computer-implemented method of claim 8, wherein the neural network comprises a classifier, and the attention operation is applied to the one or more audio embeddings and the video embedding, to produce a representation, wherein the determining of whether the given audio source corresponds to the on-screen object in the plurality of video frames comprises applying the classifier based on the representation.

11. The computer-implemented method of claim 1, further comprising:

determining, by the computing device, a request to provide the one or more predicted audio sources;

sending the request from the computing device to a second computing device, the second computing device comprising a trained version of the neural network;

after sending the request, the computing device receiving, from the second computing device, the one or more predicted audio sources; and outputting, by the computing device, the one or more predicted audio sources.

12. The computer-implemented method of claim 1, wherein the neural network comprises:

an audio separation network to generate one or more estimated audio sources; and an audio embedding network to generate one or more audio embeddings based on the one or more estimated audio sources, wherein the one or more audio embeddings comprise a representation of audio features.

13. The computer-implemented method of claim 1, further comprising:

training the neural network to receive a particular audio waveform associated with a particular plurality of video frames and predict one or more particular audio sources in the particular audio waveform.

14. The computer-implemented method of claim 13, wherein the training further comprises:

training the neural network to receive the particular audio waveform and predict a version of the particular audio waveform comprising particular audio sources that correspond to particular objects in the particular plurality of video frames.

15. The computer-implemented method of claim 13, wherein the training of the neural network comprises training a classifier based on active combinations cross entropy.

16. The computer-implemented method of claim 13, wherein the training of the neural network is performed at the computing device.

17. The computer-implemented method of claim 13, wherein the training of the neural network comprises unsupervised mixture invariant training.

18. A computing device, comprising:
one or more processors; and
data storage, wherein the data storage has stored thereon computer-executable instructions that, when executed by the one or more processors, cause the computing device to carry out operations comprising:
- receiving, by the computing device, an audio waveform associated with a plurality of video frames of video content;
- determining, by a time-domain convolutional masking network of a neural network and from the audio waveform, a neural representation comprising one or more audio frames, wherein each audio frame of the one or more audio frames comprises a respective plurality of coefficients, and wherein the respective plurality of coefficients represent one or more audio features in an encoded mixture of the audio waveform;
- predicting, by the neural network and based on the neural representation, one or more audio sources associated with the plurality of video frames;
- modifying the one or more predicted audio sources by applying a mixture consistency projection that constrains the one or more predicted audio sources to add up to the received audio waveform; and
- providing, by the computing device, the modified one or more predicted audio sources.

19. An article of manufacture comprising one or more computer readable media having computer-readable instructions stored thereon that, when executed by one or more processors of a computing device, cause the computing device to carry out operations comprising:
- receiving, by the computing device, an audio waveform associated with a plurality of video frames of video content;
- determining, by a time-domain convolutional masking network of a neural network and from the audio waveform, a neural representation comprising one or more audio frames, wherein each audio frame of the one or more audio frames comprises a respective plurality of coefficients, and wherein the respective plurality of coefficients represent one or more audio features in an encoded mixture of the audio waveform;
- predicting, by the neural network and based on the neural representation, one or more audio sources associated with the plurality of video frames;
- modifying the one or more predicted audio sources by applying a mixture consistency projection that constrains the one or more predicted audio sources to add up to the received audio waveform; and
- providing, by the computing device, the modified one or more predicted audio sources.

20. The computer-implemented method of claim 1, further comprising:
- determining whether a given predicted audio source corresponds to an on-screen object, or is an off-screen sound.

* * * * *